(12) United States Patent
Bergman et al.

(10) Patent No.: US 11,700,645 B2
(45) Date of Patent: *Jul. 11, 2023

(54) CHANNEL QUALITY REPORTING IN LTE-M

(71) Applicant: Telefonaktiebolaget LM Ericsson (publ), Stockholm (SE)

(72) Inventors: Johan Bergman, Stockholm (SE); Yutao Sui, Solna (SE); Tuomas Tirronen, Helsinki (FI); Emre Yavuz, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 45 days.

This patent is subject to a terminal disclaimer.

(21) Appl. No.: 17/342,814

(22) Filed: Jun. 9, 2021

(65) Prior Publication Data

US 2021/0298093 A1    Sep. 23, 2021

Related U.S. Application Data

(63) Continuation of application No. 16/489,399, filed as application No. PCT/SE2019/050715 on Jul. 29, 2019, now Pat. No. 11,064,532.

(Continued)

(51) Int. Cl.
| | | |
|---|---|---|
| *H04W 74/08* | (2009.01) | |
| *H04W 24/10* | (2009.01) | |
| *H04W 72/542* | (2023.01) | |

(52) U.S. Cl.
CPC ....... *H04W 74/0833* (2013.01); *H04W 24/10* (2013.01); *H04W 72/542* (2023.01)

(58) Field of Classification Search
CPC ........ H04B 7/0626; H04L 67/12; H04W 4/70; H04W 8/22; H04W 16/26; H04W 24/08;
(Continued)

(56) References Cited

U.S. PATENT DOCUMENTS 9,941,948 B2   4/2018 Yum et al.
10,326,549 B2   6/2019 Blankenship et al.
(Continued)

FOREIGN PATENT DOCUMENTS

RU    2557763 C2    7/2015
WO    2016161408 A1    10/2016
WO    2018084663 A1    5/2018

OTHER PUBLICATIONS

Ericsson, Downlink Channel Quality reporting in MSG3 in NB-IoT, 3GPP TSG-RAN2 Meeting #102, R2-1807749, 5 pages, May 2018.*
(Continued)

*Primary Examiner* — Frank Duong
(74) *Attorney, Agent, or Firm* — Murphy, Bilak, Homiller, PLLC

(57) ABSTRACT

Embodiments include methods for a user equipment (UE) to provide downlink (DL) channel-quality reports during a random-access (RA) procedure in a cell provided by a network node in a radio access network (RAN). Such embodiments include receiving, from the network node, a first indicator indicating that the UE may have to report DL channel quality in a particular message of the RA procedure; and initiating the RA procedure. The UE may be configured to operate in a coverage-enhancement (CE) mode. Such embodiments can also include initiating DL channel quality measurements based on the first indicator, wherein the DL channel quality measurements can be initiated before receiving a RA response from the network node. Other embodiments include complementary methods performed by a network node, as well as UEs and network nodes configured to perform the respective methods.

20 Claims, 15 Drawing Sheets

Related U.S. Application Data

(60) Provisional application No. 62/716,572, filed on Aug. 9, 2018.

(58) Field of Classification Search
CPC . H04W 24/10; H04W 72/12; H04W 72/1231; H04W 74/00; H04W 74/002; H04W 74/004; H04W 74/006; H04W 74/008; H04W 74/08; H04W 74/0833; H04W 76/18; H04W 84/18
See application file for complete search history.

(56) References Cited

U.S. PATENT DOCUMENTS

| | | | |
|---|---|---|---|
| 10,397,833 | B2 | 8/2019 | Lee et al. |
| 10,575,338 | B2 | 2/2020 | Park et al. |
| 10,708,956 | B2 | 7/2020 | Rico Alvarino et al. |
| 10,721,775 | B2 * | 7/2020 | Park ................ H04W 74/0833 |
| 10,779,333 | B2 | 9/2020 | Ye et al. |
| 2011/0105165 | A1 | 5/2011 | Sagfors et al. |
| 2013/0051349 | A1 | 2/2013 | Lv et al. |
| 2016/0088660 | A1 | 3/2016 | Liu et al. |
| 2016/0270038 | A1 | 9/2016 | Papasakellariou et al. |
| 2016/0295609 | A1 | 10/2016 | Vajapeyam et al. |
| 2018/0176847 | A1 | 6/2018 | Fasil Abdul et al. |
| 2018/0324854 | A1 * | 11/2018 | Phuyal ................ H04W 74/085 |
| 2019/0020424 | A1 | 1/2019 | Yerramalli et al. |
| 2019/0028905 | A1 | 1/2019 | Veeramallu et al. |
| 2019/0159260 | A1 | 5/2019 | Charbit et al. |
| 2019/0305899 | A1 | 10/2019 | Rico Alvarino et al. |
| 2020/0367294 | A1 | 11/2020 | Wong et al. |
| 2020/0383119 | A1 | 12/2020 | Sun et al. |
| 2021/0219166 | A1 * | 7/2021 | Morozov ............. H04W 80/02 |

OTHER PUBLICATIONS

"TB sizes and UL grant for Msg3", 3GPP TSG-RAN WG2 #101bis, R2-1805178, Sanya, P.R. of China, Apr. 16-20, 2018, pp. 1-12.

"3GPP TS 36.213 V14.7.0", Release 14; Random Access Procedure, Jun. 2018, pp. 1-468.

"Draft Report of 3GPP TSG RAN WG1 #93 v0.2.0 (Busan, South Korea, May 21-25, 2018)", 3GPP TSG RAN WG1 Meeting #94; R1-180xxxx; Gothenburg, Sweden, Aug. 20-24, 2018, pp. 1-200.

"Introducing WIs endorsed for ASN.1 review of 36.331 REL-15 second drop", 3GPP TSG WG2 NR AH 1807; R2-1810773; Montreal, Canada, Jul. 2-6, 2018, pp. 1-902.

"Introduction of DL channel quality reporting in MSG3", 3GPP TSG-RAN WG2 Meeting #101 bis; R2-1805076; Sanya, P.R. China, Apr. 16-20, 2018, pp. 1-5.

"Introduction of DL channel quality reporting in MSG3", 3GPP TSG-RAN WG2 Meeting #102; R2-1807869; Busan, Korea; revision of R2-1805076, May 21-25, 2018, pp. 1-10.

"LS on NB-IoT Downlink Channel Quality Determination and Report", 3GPP TSG RAN WG1 Meeting #92 R1-1803163; Athens, Greece, Feb. 26-Mar. 2, 2018, p. 1.

"Overall procedure for data transfer in inactive state", 3GPP TSG. RAN WG2 Meeting #6; R2.168051; Reno, USA, Nov. 14-18, 2016, pp. 1-6.

"Support of quality report in Msg3 in LTE-MTC", 3GPP TSG-RAN WG1 Meeting #94; Tdoc R1-1808038; Göteborg, Sweden, Aug. 20-24, 2018, pp. 1-5.

"3GPP TS 36.213 V15.2.0", 3rd Generation Partnership Project; Technical Specification Group Radio Access Network; Evolved Universal Terrestrial Radio Access (E-UTRA); Physical layer procedures (Release 15), Jun. 2018, pp. 1-541.

"3GPP TS 36.321 V15.2.0", 3rd Generation Partnership Project; Technical Specification Group Radio Access Network; Evolved Universal Terrestrial Radio Access (E-UTRA); Medium Access Control (MAC) protocol specification (Release 15), Jul. 2018, pp. 1-126.

"3GPP TS 36.331 V15.2.0", 3rd Generation Partnership Project; Technical Specification Group Radio Access Network; Evolved Universal Terrestrial Radio Access (E-UTRA); Radio Resource Control (RRC); Protocol specification (Release 15), Jun. 2018, pp. 1-269.

Höglund, Andreas, et al., "3GPP Release 15 Early Data Transmission", IEEE Communications Standards Magazine,, Jun. 2018, pp. 90-96.

"New WID on Rel-16 MTC enhancements for LTE", 3GPP TSG RAN Meeting #80; RP-181450; La Jolla, USA, Jun. 11-14, 2018, pp. 1-4.

* cited by examiner

| DCI contents | CEmodeA | CEmodeB |
|---|---|---|
| Msg3 PUSCH narrowband index | $N_{NB}^{index}$ | 2 |
| Msg3 PUSCH Resource allocation | 4 | 3 |
| Number of Repetitions for Msg3 PUSCH | 2 | 3 |
| MCS | 3 | 0 |
| TBS | 0 | 2 |
| TPC | 3 | 0 |
| CSI request | 1 | 0 |
| UL delay | 1 | 0 |
| Msg3/4 MPDCCH narrowband index | 2 | 2 |
| Zero padding | $4 - N_{NB}^{index}$ | 0 |
| Total bits | 20 | 12 |

FIG. 5A

| DCI contents | CEmodeA | CEmodeB |
|---|---|---|
| Msg3 PUSCH narrowband index | $N_{NB}^{index}$ | 3 |
| Msg3 PUSCH Resource allocation | 4 | 3 |
| Number of Repetitions for Msg3 PUSCH | 2 | 3 |
| TPC | 3 | 0 |
| CSI request | 1 | 0 |
| UL delay | 1 | 0 |
| Msg3/4 MPDCCH narrowband index | $N_{NB}^{index}$ | 3 |
| Zero padding | $8 - 2N_{NB}^{index}$ | 0 |
| Total bits | 20 | 12 |

FIG. 5B

| R | Timing Advance Command | Oct 1 |
|---|---|---|
| Timing Advance Command | UL Grant | Oct 2 |
| UL Grant || Oct 3 |
| UL Grant || Oct 4 |
| Temporary C-RNTI || Oct 5 |
| Temporary C-RNTI || Oct 6 |

*FIG. 6A*

| R | Timing Advance Command | Oct 1 |
|---|---|---|
| Timing Advance Command | UL Grant | Oct 2 |
| UL Grant || Oct 3 |
| Temporary C-RNTI || Oct 4 |
| Temporary C-RNTI || Oct 5 |

*FIG. 6B*

| $I_{MCS}$ | $N_{PRB}$ | | | |
|---|---|---|---|---|
| | 1 | 2 | 3 | 6 |
| 0 | 16 | 32 | 56 | 152 |
| 1 | 24 | 56 | 88 | 208 |
| 2 | 32 | 72 | 144 | 256 |
| 3 | 40 | 104 | 176 | 328 |
| 4 | 56 | 120 | 208 | 408 |
| 5 | 72 | 144 | 224 | 504 |
| 6 | 328 | 176 | 256 | 600 |
| 7 | 104 | 224 | 328 | 712 |

*FIG. 7A*

| $I_{TBS}$ | $N_{PRB}$ | |
|---|---|---|
| | 1 | 2 |
| 0 | 56 | 152 |
| 1 | 88 | 208 |
| 2 | 144 | 256 |
| 3 | 176 | 328 |

*FIG. 7B*

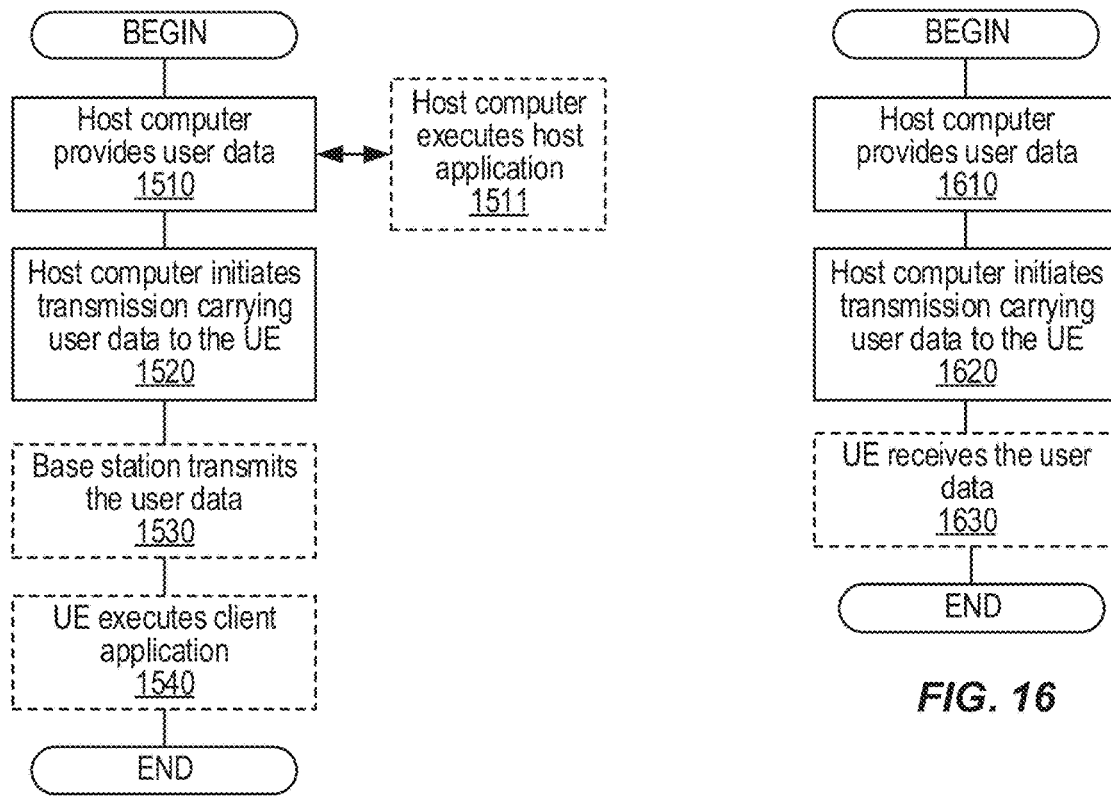
FIG. 15
FIG. 16
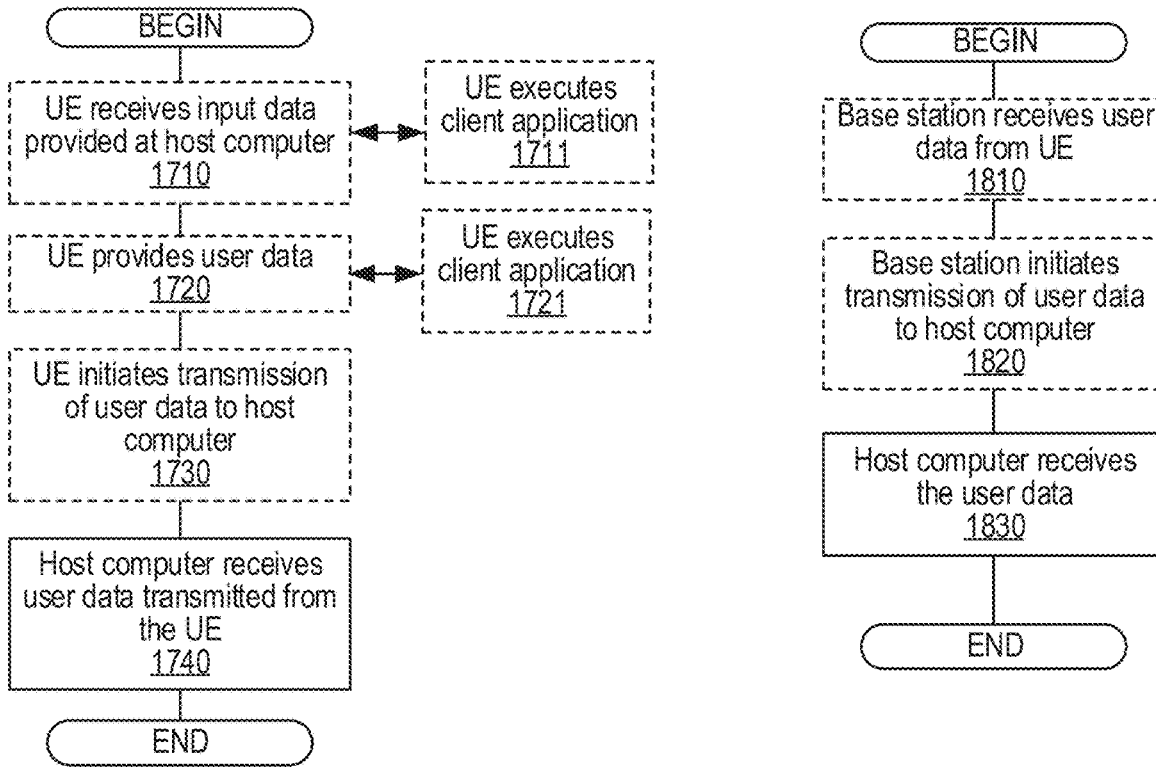
FIG. 17
FIG. 18

CHANNEL QUALITY REPORTING IN LTE-M

CROSS-REFERENCE TO RELATED APPLICATIONS

This application is a continuation of, and claims the benefit of priority from, U.S. application Ser. No. 16/489,399 filed on Aug. 28, 2019, which is a U.S. national-stage application claiming priority to International Appl. No. PCT/SE2019/050715 filed on Jul. 29, 2019, which claims priority to U.S. Provisional Appl. No. 62/716,572 filed on Aug. 9, 2018. The entire disclosures of the above-mentioned applications are incorporated herein by reference for all purposes.

TECHNICAL FIELD

The present application relates generally to the field of wireless communication networks and systems, and more specifically to techniques that facilitate a user equipment (UE) to report downlink (DL) channel quality during a random access procedure towards a wireless network, even when the UE is in a coverage enhancement mode.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Long Term Evolution (LTE) is an umbrella term for so-called fourth-generation (4G) radio access technologies developed within the Third-Generation Partnership Project (3GPP) and initially standardized in Releases 8 and 9, also known as Evolved UTRAN (E-UTRAN). LTE is targeted at various licensed frequency bands and is accompanied by improvements to non-radio aspects commonly referred to as System Architecture Evolution (SAE), which includes Evolved Packet Core (EPC) network. LTE continues to evolve through subsequent releases. One of the features of Release 11 is an enhanced Physical Downlink Control Channel (ePDCCH), which has the goals of increasing capacity and improving spatial reuse of control channel resources, improving inter-cell interference coordination (ICIC), and supporting antenna beamforming and/or transmit diversity for control channel.

An overall exemplary architecture of a network comprising LTE and SAE is shown in FIG. 1. E-UTRAN 100 comprises one or more evolved Node B's (eNB), such as eNBs 105, 110, and 115, and one or more user equipment (UE), such as UE 120. As used within the 3GPP standards, "user equipment" or "UE" means any wireless communication device (e.g., smartphone or computing device) that is capable of communicating with 3GPP-standard-compliant network equipment, including E-UTRAN as well as UTRAN and/or GERAN, as the third- ("3G") and second-generation ("2G") 3GPP radio access networks are commonly known.

As specified by 3GPP, E-UTRAN 100 is responsible for all radio-related functions in the network, including radio bearer control, radio admission control, radio mobility control, scheduling, and dynamic allocation of resources to UEs in uplink and downlink, as well as security of the communications with the UE. These functions reside in the eNBs, such as eNBs 105, 110, and 115. The eNBs in the E-UTRAN communicate with each other via the X1 interface, as shown in FIG. 1. The eNBs also are responsible for the E-UTRAN interface to the EPC, specifically the S1 interface to the Mobility Management Entity (MME) and the Serving Gateway (SGW), shown collectively as MME/S-GWs 134 and 138 in FIG. 1. Generally speaking, the MME/S-GW handles both the overall control of the UE and data flow between the UE and the rest of the EPC. More specifically, the MME processes the signaling protocols between the UE and the EPC, which are known as the Non-Access Stratum (NAS) protocols. The S-GW handles all Internet Protocol (IP) data packets between the UE and the EPC, and serves as the local mobility anchor for the data bearers when the UE moves between eNBs, such as eNBs 105, 110, and 115.

FIG. 2A shows a high-level block diagram of an exemplary LTE architecture in terms of its constituent entities—UE, E-UTRAN, and EPC—and high-level functional division into the Access Stratum (AS) and the Non-Access Stratum (NAS). FIG. 2A also illustrates two particular interface points, namely Uu (UE/E-UTRAN Radio Interface) and S1 (E-UTRAN/EPC interface), each using a specific set of protocols, i.e., Radio Protocols and S1 Protocols. Each of the two protocols can be further segmented into user plane (or "U-plane") and control plane (or "C-plane") protocol functionality. On the Uu interface, the U-plane carries user information (e.g., data packets) while the C-plane is carries control information between UE and E-UTRAN.

FIG. 2B illustrates a block diagram of an exemplary C-plane protocol stack on the Uu interface comprising Physical (PHY), Medium Access Control (MAC), Radio Link Control (RLC), Packet Data Convergence Protocol (PDCP), and Radio Resource Control (RRC) layers. The PHY layer is concerned with how and what characteristics are used to transfer data over transport channels on the LTE radio interface. The MAC layer provides data transfer services on logical channels, maps logical channels to PHY transport channels, and reallocates PHY resources to support these services. The RLC layer provides error detection and/or correction, concatenation, segmentation, and reassembly, reordering of data transferred to or from the upper layers. The PHY, MAC, and RLC layers perform identical functions for both the U-plane and the C-plane. The PDCP layer provides ciphering/deciphering and integrity protection for both U-plane and C-plane, as well as other functions for the U-plane such as header compression.

FIG. 2C shows a block diagram of an exemplary LTE radio interface protocol architecture from the perspective of the PHY. The interfaces between the various layers are provided by Service Access Points (SAPs), indicated by the ovals in FIG. 2C. The PHY layer interfaces with the MAC and RRC protocol layers described above. The MAC provides different logical channels to the RLC protocol layer (also described above), characterized by the type of information transferred, whereas the PHY provides a transport channel to the MAC, characterized by how the information is transferred over the radio interface. In providing this transport service, the PHY performs various functions including error detection and correction; rate-matching and mapping of the coded transport channel onto physical channels; power weighting, modulation; and demodulation of physical channels; transmit diversity, beamforming multiple input multiple output (MIMO) antenna processing; and providing radio measurements to higher layers, such as RRC.

Downlink (i.e., eNB to UE) physical channels provided by the LTE PHY include Physical Downlink Shared Channel (PDSCH), Physical Multicast Channel (PMCH), Physical Downlink Control Channel (PDCCH), Relay Physical Downlink Control Channel (R-PDCCH), Physical Broadcast Channel (PBCH), Physical Control Format Indicator Channel (PCFICH), and Physical Hybrid ARQ Indicator Channel (PHICH). In addition, the LTE PHY downlink includes various reference signals, synchronization signals, and discovery signals.

Uplink (i.e., UE to eNB) physical channels provided by the LTE PHY include Physical Uplink Shared Channel (PUSCH), Physical Uplink Control Channel (PUCCH), and Physical Random-Access Channel (PRACH). In addition, the LTE PHY uplink includes various reference signals including demodulation reference signals (DM-RS), which are transmitted to aid the eNB in the reception of an associated PUCCH or PUSCH; and sounding reference signals (SRS), which are not associated with any uplink channel.

Since LTE Release 8, three Signaling Radio Bearers (SRBs), namely SRB0, SRB1 and SRB2 have been available for the transport of RRC and Non-Access Stratum (NAS) messages between the UE and eNB. A new SRB, known as SRB1bis, was also introduced in rel-13 for supporting DoNAS (Data Over NAS) in NB-IoT.

SRB0 carries RRC messages using the CCCH logical channel, and it is used for handling RRC connection setup, resume, and re-establishment. Once the UE is connected to the eNB (i.e., RRC connection setup or RRC connection reestablishment/resume has succeeded), SRB1 is used for handling further RRC messages (which may include a piggybacked NAS message) and NAS messages, prior to the establishment of SRB2, all using DCCH logical channel SRB2 is used for RRC messages as logged measurement information, as well as for NAS messages, all using DCCH. SRB2 has a lower priority than SRB1, because logged measurement information and NAS messages can be lengthy and could cause the blocking of more urgent and smaller SRB1 messages. SRB2 is always configured by E-UTRAN after security activation.

The multiple access scheme for the LTE PHY is based on Orthogonal Frequency Division Multiplexing (OFDM) with a cyclic prefix (CP) in the downlink, and on Single-Carrier Frequency Division Multiple Access (SC-FDMA) with a cyclic prefix in the uplink. To support transmission in paired and unpaired spectrum, the LTE PHY supports both Frequency Division Duplexing (FDD) (including both full- and half-duplex operation) and Time Division Duplexing (TDD). FIG. 3 shows an exemplary radio frame structure ("type 1") used for LTE FDD downlink (DL) operation. The DL radio frame has a fixed duration of 10 ms and consists of 20 slots, labeled 0 through 19, each with a fixed duration of 0.5 ms. A 1-ms subframe comprises two consecutive slots where subframe i consists of slots 2i and 2i+1. Each exemplary FDD DL slot consists of $N^{DL}_{symb}$ OFDM symbols, each of which is comprised of $N_{sc}$ OFDM subcarriers.

Exemplary values of $N^{DL}_{symb}$ can be 7 (with a normal CP) or 6 (with an extended-length CP) for subcarrier bandwidth (or spacing) of 15 kHz. The value of $N_{sc}$ is configurable based upon the available channel bandwidth. Since persons of ordinary skill in the art are familiar with the principles of OFDM, further details are omitted in this description.

As shown in FIG. 3, a combination of a particular subcarrier in a particular symbol is known as a resource element (RE). Each RE is used to transmit a particular number of bits, depending on the type of modulation and/or bit-mapping constellation used for that RE. For example, some REs may carry two bits using QPSK modulation, while other REs may carry four or six bits using 16- or 64-QAM, respectively. The radio resources of the LTE PHY are also defined in terms of physical resource blocks (PRBs). A PRB spans $N^{RB}_{sc}$ sub-carriers over the duration of a slot (i.e., $N^{DL}_{symb}$ symbols), where $N^{RB}_{sc}$ is typically either 12 (with a 15-kHz sub-carrier bandwidth) or 24 (7.5-kHz bandwidth). A PRB spanning the same $N^{RB}_{sc}$ subcarriers during an entire subframe (i.e., $2N^{DL}_{symb}$ symbols) is known as a PRB pair. Accordingly, the resources available in a subframe of the LTE PHY DL comprise $N^{DL}_{RB}$ PRB pairs, each of which comprises $2N^{DL}_{symb} \cdot N^{RB}_{sc}$ REs. For a normal CP and 15-KHz sub-carrier bandwidth, a PRB pair comprises 168 REs.

One exemplary characteristic of PRBs is that consecutively numbered PRBs (e.g., $PRB_i$ and $PRB_{i+1}$) comprise consecutive blocks of subcarriers. For example, with a normal CP and 15-KHz sub-carrier bandwidth, $PRB_0$ comprises sub-carrier 0 through 11 while $PRB_1$ comprises sub-carriers 12 through 23. The LTE PHY resource also can be defined in terms of virtual resource blocks (VRBs), which are the same size as PRBs but may be of either a localized or a distributed type. Localized VRBs can be mapped directly to PRBs such that VRB $n_{VRB}$ corresponds to PRB $n_{PRB}=n_{VRB}$. On the other hand, distributed VRBs may be mapped to non-consecutive PRBs according to various rules, as described in 3GPP Technical Specification (TS) 36.213 or otherwise known to persons of ordinary skill in the art. However, the term "PRB" shall be used in this disclosure to refer to both physical and virtual resource blocks. Moreover, the term "PRB" will be used henceforth to refer to a resource block for the duration of a subframe, i.e., a PRB pair, unless otherwise specified.

Downlink (i.e., eNB to UE) physical channels carried by the LTE PHY include Physical Downlink Shared Channel (PDSCH), Physical Multicast Channel (PMCH), Physical Downlink Control Channel (PDCCH), Relay Physical Downlink Control Channel (R-PDCCH), Physical Broadcast Channel (PBCH), Physical Control Format Indicator Channel (PCFICH), and Physical Hybrid ARQ Indicator Channel (PHICH). In addition, the LTE PHY downlink includes various reference signals, synchronization signals, and discovery signals.

Exemplary LTE FDD uplink (UL) radio frames can configured in a similar manner as the exemplary FDD DL radio frame shown in FIG. 3. For example, using terminology consistent with the above DL description, each UL slot consists of $N^{UL}_{symb}$ OFDM symbols, each of which includes $N_{sc}$ OFDM subcarriers.

Uplink (i.e., UE to eNB) physical channels carried by the LTE PHY include Physical Uplink Shared Channel (PUSCH), Physical Uplink Control Channel (PUCCH), and Physical Random-Access Channel (PRACH). In addition, the LTE PHY uplink includes various reference signals including demodulation reference signals (DM-RS), which are transmitted to aid the eNB in the reception of an associated PUCCH or PUSCH; and sounding reference signals (SRS), which are not associated with any uplink channel.

Both PDCCH and PUCCH can be transmitted on aggregations of one or several consecutive control channel elements (CCEs), and a CCE is mapped to the physical resource based on resource element groups (REGs), each of which is comprised of a plurality of REs. For example, a CCE can comprise nine (9) REGs, each of which can comprise four (4) REs.

As discussed above, the LTE PHY maps the various DL and UL physical channels to the resources shown in FIGS. 3A and 3B, respectively. For example, the PHICH carries HARQ feedback (e.g., ACK/NAK) for UL transmissions by the UEs. Similarly, PDCCH carries scheduling assignments, channel quality feedback (e.g., CSI) for the UL channel, and other control information. Likewise, a PUCCH carries uplink control information such as scheduling requests, CSI for the downlink channel, HARQ feedback for eNB DL transmissions, and other control information. Both PDCCH and PUCCH can be transmitted on aggregations of one or several consecutive control channel elements (CCEs), and a CCE is mapped to the physical resource based on resource element groups (REGs), each of which is comprised of a plurality of REs. For example, a CCE can comprise nine (9) REGs, each of which can comprise four (4) REs.

In the LTE, two main states of UE are RRC IDLE and RRC CONNECTED. In RRC IDLE state, the UE does not belong to any cell, no RRC context has been established for the UE, and the UE is out of UL synchronization with the eNB. As such, only the RACH is available for UE UL data transmission. Furthermore, in RRC IDLE, the UE monitors a paging channel (PCH) according to a discontinuous reception (DRX) cycle.

In order to move a UE from RRC IDLE to RRC CONNECTED state, the UE must perform a random-access (RA) procedure. In RRC CONNECTED state, the cell to which the UE belongs is known and RRC context has been established. As such, necessary parameters for communication are known to both the UE and the eNB. For example, the Cell Radio Network Temporary Identifier (C-RNTI)—a UE identity used for signaling between UE and network—has been configured.

In LTE, to facilitate improved performance, a data receiver (e.g., UE) can measure the amplitude and phase of a known transmitted data symbol (e.g., a pilot symbol and/or reference symbol) and send these measurements to the data transmitter (e.g., eNB) as "channel state information" (CSI). CSI can include, for example, amplitude and/or phase of the channel at one or more frequencies, amplitude and/or phase of time-domain multipath components of the signal via the channel, direction of arrival of multipath components of the signal via the channel, and other direct channel measurements known by persons of ordinary skill. Alternately, or in addition, CSI can include a set of transmission parameters recommended for the channel based on one or more channel measurements.

In Release 13, 3GPP developed specifications for narrowband Internet of Things (NB-IoT) and LTE Machine-Type Communications (LTE-M or LTE-MTC). These new radio access technologies provide connectivity to services and applications demanding qualities such as reliable indoor coverage and high capacity in combination with low system complexity and optimized device power consumption. To support reliable coverage in the most extreme situations, both NB-IoT and LTE-M UEs can perform link adaptation on all physical channels using subframe bundling and repetitions. This applies to (N/M)PDCCH and (N)PDSCH in the DL, and to (N)PUSCH, (N)PRACH, and PUCCH (only for LTE-M) in the UL.

LTE-M includes bandwidth-reduced, low-complexity (BL) UEs and UEs in Coverage Enhancement (CE), collectively known as BL/CE UEs. These UEs can operate in Coverage Enhancement Mode A (CEmodeA) which is optimized for no repetitions or a small number of repetitions, or in Coverage Enhancement Mode B (CEmodeB) which is optimized for moderate-to-large numbers of repetitions providing large coverage enhancement. More specifically, CEmodeA includes PRACH CE levels 0 and 1, while CEmodeB includes PRACH CE levels 2 and 3.

Currently, CSI reporting is only supported in RRC connected mode for LTE-M UEs in CEmodeA, using procedures given in 3GPP TS 36.213 (V15.2.0) section 7.2. A BL/CE UE configured with CEmodeB is not expected to be configured with either aperiodic CSI or periodic CSI reporting. This can lead to various problems, issues, and/or difficulties in the deployment of LTE-M networks and UEs.

SUMMARY

Exemplary embodiments disclosed herein address these and other problems, issues, and/or drawbacks of existing solutions by providing a flexible and efficient approach for enabling a user equipment (UE) to report downlink (DL) channel quality (e.g., CSI) during a random access procedure, regardless of the particular coverage enhancement (CE) mode in which the UE is configured to operate. In the same manner, exemplary embodiments also enable the network node to request such information and utilize it for timely, correct, and efficient performance of DL data transmission to the UE. Furthermore, such timely, correct, and efficient operations facilitate improved mobility of a UE between various cells in the RAN and reduce the latency of data transmission during mobility.

Exemplary embodiments include various methods and/or procedures for providing downlink (DL) channel-quality reports during a random-access (RA) procedure in a cell provided by a network node in a radio access network (RAN). The exemplary methods and/or procedures can be implemented, for example, by a user equipment (UE, e.g., wireless device, IoT device, MTC device, etc. or component thereof) configured to operate in a coverage-enhancement (CE) mode in the cell.

The exemplary methods and/or procedures can include receiving, from the network node, a first indicator indicating that the UE may have to report DL channel quality in a particular message of the RA procedure. In some embodiments, the RAN can be a Long-Term Evolution (LTE) network and the particular message can be a Msg3 of an LTE RA procedure. In various embodiments, the first indicator can be received in system information broadcast by the network node or in a RA response from the network node.

The exemplary methods and/or procedures can also include initiating the RA procedure. In some embodiments, the exemplary methods and/or procedures can also include initiating DL channel quality measurements based on the first indicator. In some embodiments, the exemplary methods and/or procedures can also include receiving a RA response from the network node. In some embodiments the DL channel quality measurements can be initiated after initiating the RA procedure but before receiving the RA response.

In some embodiments, the exemplary methods and/or procedures can also include determining whether to include a DL channel quality report in the particular message based on at least one of the following: the first indicator, and the content of the RA response. In some embodiments, the exemplary methods and/or procedures can also include transmitting the particular message to the network node, wherein the particular message conditionally includes the DL channel quality report.

Other exemplary embodiments include methods and/or procedures to enable downlink (DL) channel-quality reports from user equipment (UEs) performing a random-access, RA, procedure. The exemplary methods and/or procedures can be implemented, for example, by a network node (e.g., eNB, gNB, ng-eNB, or components thereof) configured to provide a cell in a radio access network (RAN).

These exemplary methods and/or procedures can include transmitting a first indicator that indicates that the UEs may have to report DL channel quality in a particular message of the RA procedure. In some embodiments, one or more of the UEs can be configured to operate in a coverage enhancement (CE) mode. In some embodiments, the RAN can be a Long-Term Evolution (LTE) network and the particular message can be a Msg3 of an LTE RA procedure. In various embodiments, the first indicator can be transmitted in system information broadcast by the network node or in a RA response.

The exemplary methods and/or procedures can also include determining that a particular UE has initiated the RA procedure in the cell (e.g., by detecting one or more RA preambles transmitted by the UE). In some embodiments, the exemplary methods and/or procedures can also include transmitting a RA response to the UE. In some embodiments, the exemplary methods and/or procedures can also include receiving the particular message from the particular UE, wherein the particular message conditionally includes a DL channel quality report. The conditions under which the DL channel quality report are included can be based on at least one of the following: the first indicator, and the content of the RA response.

Other exemplary embodiments include UEs (e.g., wireless devices, IoT devices, MTC devices, etc. or component(s) thereof) or network nodes (e.g., base stations, eNBs, gNBs, ng-eNBs, etc. or component(s) thereof) configured to perform operations corresponding to the exemplary methods and/or procedures described herein. Other exemplary embodiments include non-transitory, computer-readable media storing program instructions that, when executed by at least one processor, configure such network devices or user equipment to perform operations corresponding to the exemplary methods and/or procedures described herein.

These and other objects, features and advantages of the exemplary embodiments of the present disclosure will become apparent upon reading the following Detailed Description in view of the Drawings briefly described below.

BRIEF DESCRIPTION OF THE DRAWINGS

FIGS. 5A and 5B show exemplary RA Response Grant format/content for BL/CE UEs without and with early data transmission (EDT), respectively.

FIGS. 6A and 6B show definitions of exemplary MAC RAR message fields for BL/CE UEs in CEmodeA and CEmodeB, respectively.

FIGS. 7A and 7B show exemplary Msg3 Transport Block Size (TBS) tables in CEmodeA and CEmodeB, respectively, without EDT.

FIGS. 15-18 are flow diagrams illustrating various exemplary methods and/or procedures implemented in a communication system, according to various exemplary embodiments of the present disclosure.

DETAILED DESCRIPTION

Figure 1:
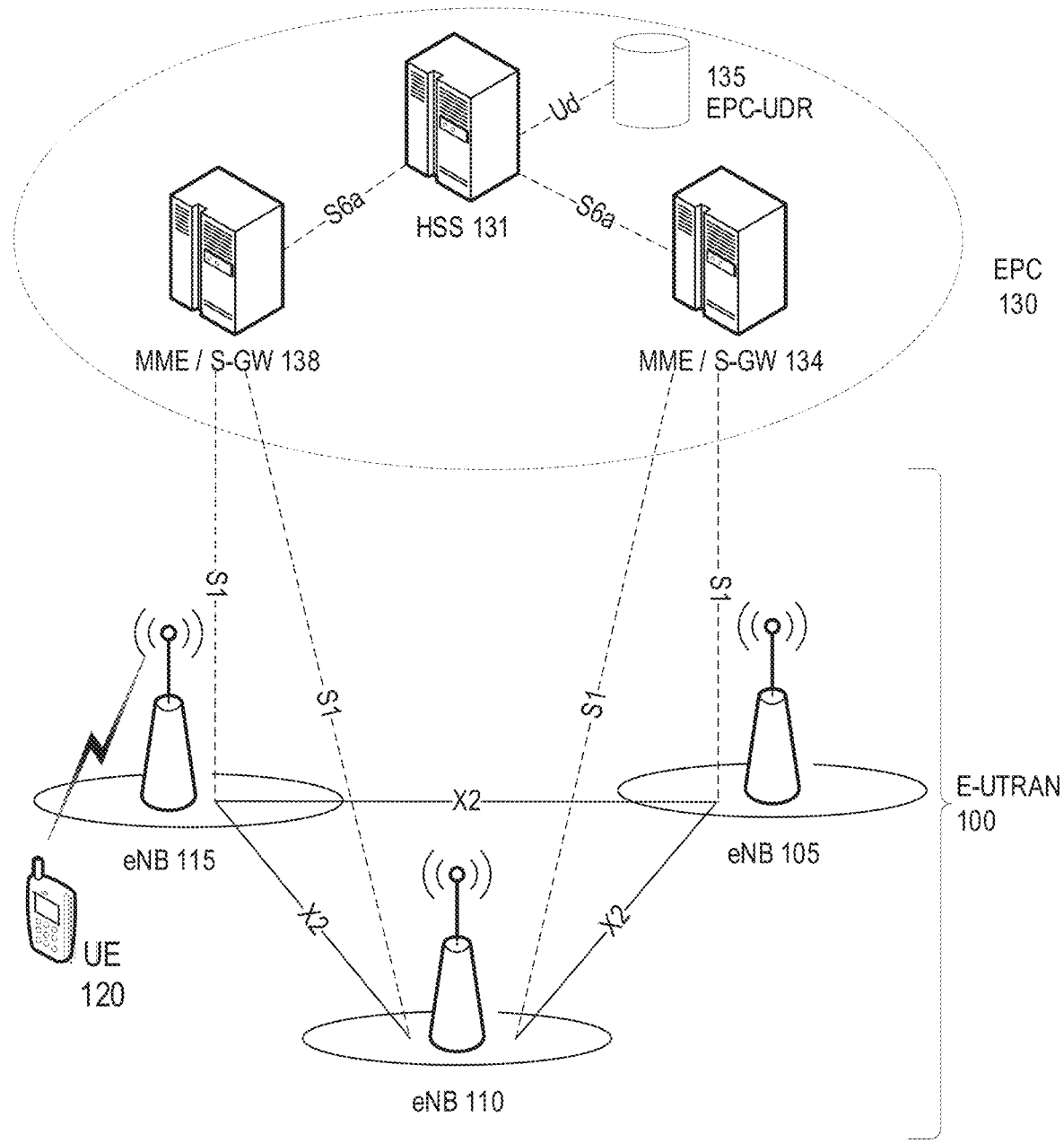
FIG. 1 is a high-level block diagram of an exemplary architecture of the Long-Term Evolution (LTE) Evolved UTRAN (E-UTRAN) and Evolved Packet Core (EPC) network, as standardized by 3GPP.
Figure 2A:
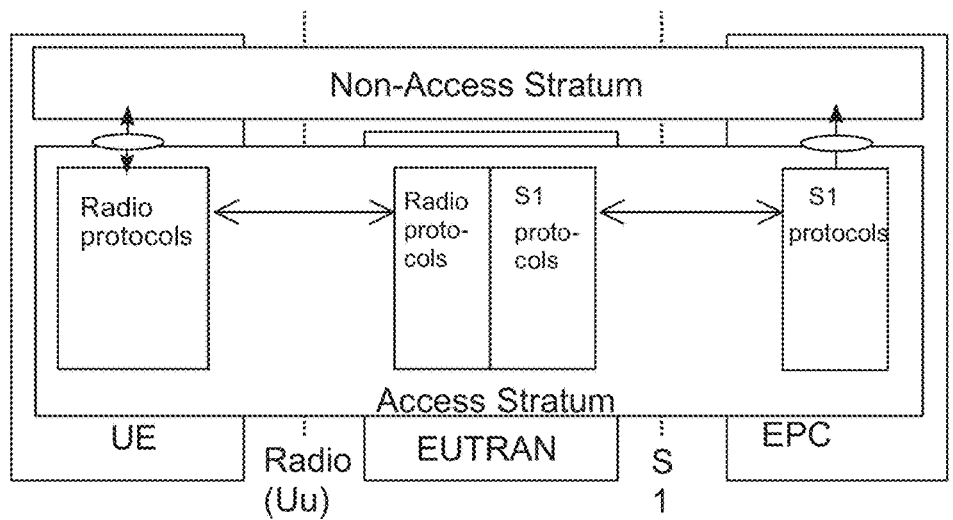
FIG. 2A is a high-level block diagram of an exemplary E-UTRAN architecture in terms of its constituent components, protocols, and interfaces.
Figure 2B:
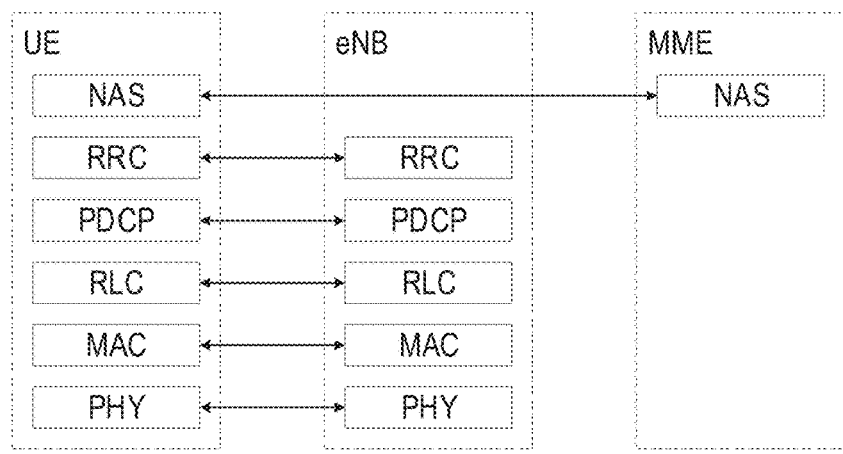
FIG. 2B is a block diagram of exemplary protocol layers of the control-plane portion of the radio (Uu) interface between a user equipment (UE) and the E-UTRAN.
Figure 2C:
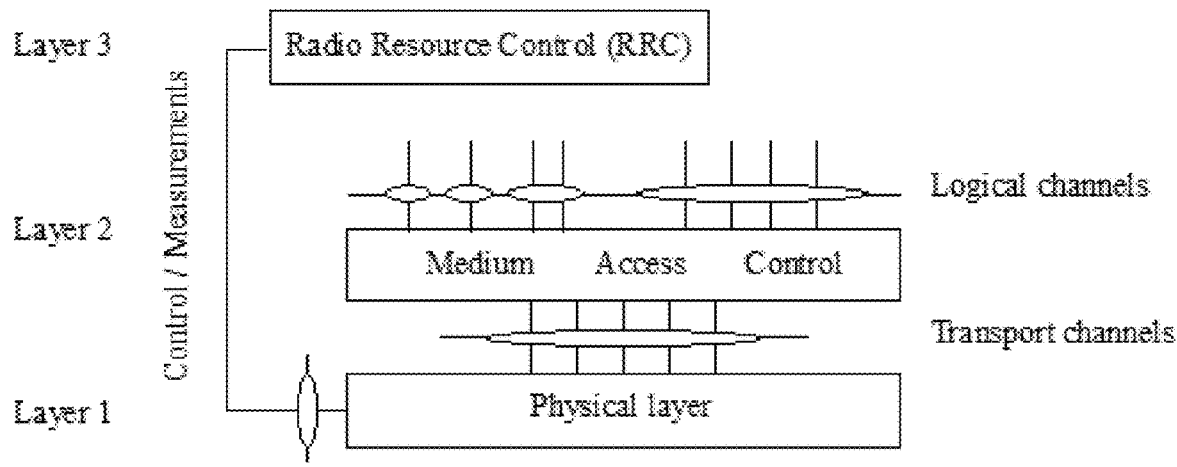
FIG. 2C is a block diagram of an exemplary LTE radio interface protocol architecture from the perspective of the PHY layer.
Figure 3:
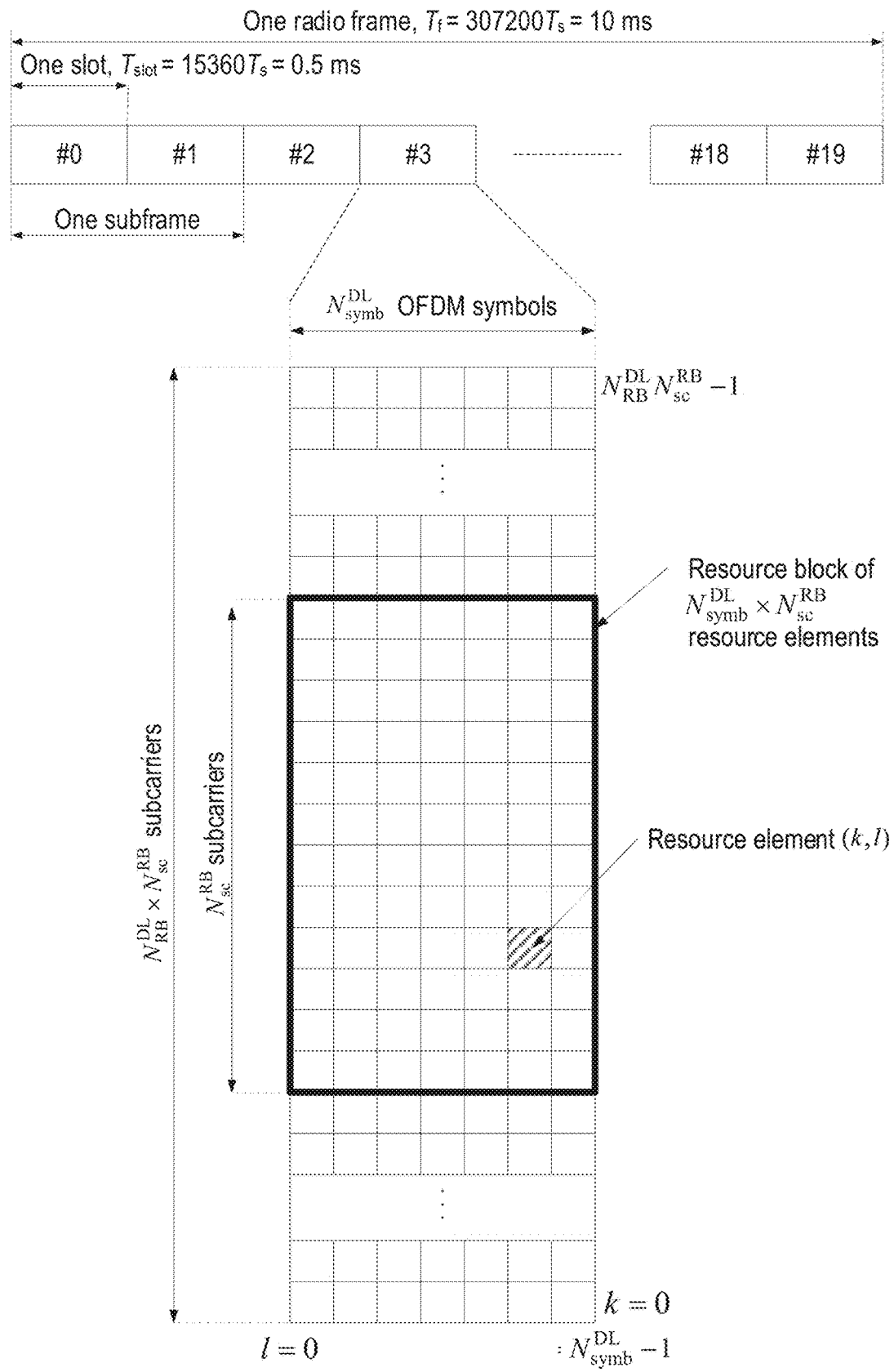
FIG. 3 is a block diagram of an exemplary downlink LTE radio frame structure used for frequency division duplexing (FDD) operation.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art. Furthermore, the following terms are used throughout the description given below:

Radio Node: As used herein, a "radio node" can be either a "radio access node" or a "wireless device."

Radio Access Node: As used herein, a "radio access node" (or "radio network node") can be any node in a radio access network (RAN) of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an enhanced or evolved Node B (eNB) in a 3GPP LTE network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.

Wireless Device: As used herein, a "wireless device" (or "WD" for short) is any type of device that has access to (i.e., is served by) a cellular communications network by communicate wirelessly with network nodes and/or other wireless devices. Unless otherwise noted, the term "wireless device" is used interchangeably herein with "user equipment" (or "UE" for short). Some examples of a wireless device include, but are not limited to, a UE in a 3GPP network and a Machine Type Communication (MTC) device. Communicating wirelessly can involve transmitting and/or receiving wireless signals using electromagnetic waves, radio waves, infrared waves, and/or other types of signals suitable for conveying information through air.

Network Node: As used herein, a "network node" is any node that is either part of the radio access network or the core network of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

Note that the description given herein focuses on a 3GPP cellular communications system and, as such, 3GPP terminology or terminology similar to 3GPP terminology is oftentimes used. However, the concepts disclosed herein are not limited to a 3GPP system. Furthermore, although the term "cell" is used herein, it should be understood that (particularly with respect to 5G NR) beams may be used instead of cells and, as such, concepts described herein apply equally to both cells and beams.

Figure 4:
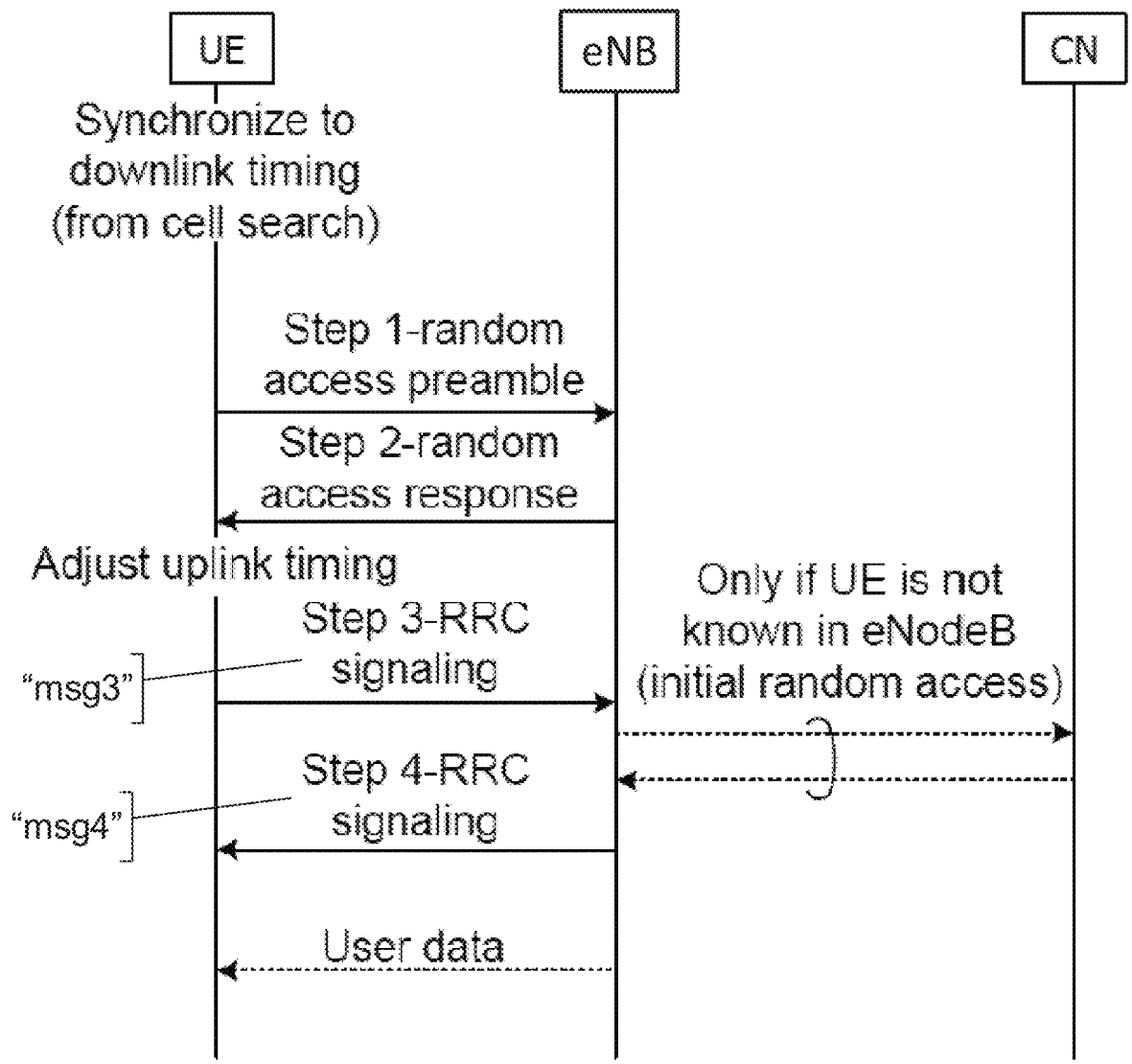
FIG. 4 illustrates certain operations comprising an exemplary LTE random access (RA) procedure initiated by a UE.

As briefly mentioned above, a UE must perform a random-access (RA) procedure to move from RRC IDLE to RRC CONNECTED state. FIG. 4 illustrates the steps in an exemplary LTE RA procedure. In step 1, the UE randomly selects one access preamble from a known set of preambles transmitted by the network through the broadcast channel. The purpose is to avoid collisions by separating the preambles in a code domain. In LTE, there are typically 64 different available preambles in each cell which in turn may be divided into multiple groups. The grouping allows the UE to signal with one bit whether it needs radio resources for a small or large message (data package). That is, a randomly selected preamble from one group can indicate that the UE has a small amount of data to send, while a preamble selected from another group indicates that resources for a larger amount of data are needed.

The UE transmits the RA preamble only on certain UL time/frequency resources, which are made known to all UEs via the broadcast channel. The eNB detects all non-colliding preambles transmitted by UEs in these resources and estimates the roundtrip time (RTT) for each UE. The RTT is needed to achieve time and frequency synchronization in both DL and UL for the UE in the LTE OFDM-based system.

In Step 2, the RA response (RAR) from the eNB to the UE carries the RTT, a temporary UE identity, and UL resources to use in step 3. As mentioned above, the UE can use the received RTT to adjust its transmission window in order to obtain UL synchronization. The RAR is scheduled on a DL shared channel (e.g., PDSCH) and is indicated on a DL control channel (e.g., PDCCH) using an identity reserved for RARs. All UEs that have transmitted a RA preamble monitor DL control channels for a RAR within a time window after their preamble transmissions. If the UE does not detect a RAR within the time window, it declares a failed attempt and repeats step 1 using an increased transmit power.

The received UL resource assignment to be used in Step 3 is essentially a pointer (e.g., to a location on the UL time/frequency resource grid) that informs the UE exactly which subframes (time) to transmit in and what resource blocks (frequency) to use. The higher layers indicate the 20-bit UL Grant to the PHY, as defined in 3GPP TS 36.321 and 36.213. In the LTE PHY, this is referred to the RAR Grant and is carried on the PDCCH by a specific format of downlink control information (DCI). The RAR Grant size is intended to balance between minimizing number of bits to convey the resource assignment while providing some resource assignment flexibility for the eNB scheduler. In general, the length of the PHY message depends on the system bandwidth.

In step 3, upon correct reception of the RAR in step 2, the UE is time synchronized with the eNB. Before any transmission can take place, a unique identity C-RNTI is assigned. The UE transmission in this step (referred to as "message 3" or "msg3" for short) uses the UL channel radio resources assigned in step 2. Additional message exchange might also be needed depending on the UE state, as indicated in FIG. 4 by the arrows drawn with dashed lines. In particular, if the UE is not known in the eNB, then some signaling is needed between the eNB and the core network. Step 4 is primarily concerned with contention resolution and will not be described further herein.

In the work item description (WID) of Rel-16 MTC enhancements for LTE, one of the objectives is to improve DL transmission efficiency and/or UE power consumption by specifying the following:
  Support for mobile-terminated (MT) early data transmission (EDT);
  Quality report in MSG3 at least for EDT;
  MPDCCH performance improvement by using CRS at least in connected mode; and
  Support for UE-group wake-up signal (WUS).

In LTE-MTC (LTE-M), channel state information (CSI) reporting is supported in connected mode in CEModeA, but not in CEModeB. For periodic CSI reporting, PUCCH is used. For aperiodic CSI reporting, PUSCH is used according to 3GPP TS 36.213 (v15.2.0) section 7.2.1, which specifies that a BL/CE UE shall perform aperiodic CSI reporting using the PUSCH upon decoding either an uplink DCI format or a RAR Grant for the serving cell, if the respective CSI request field is set to trigger a report and is not reserved. The subframe(s) in which the PUSCH carrying the corresponding aperiodic CSI reporting triggered by an UL DCI format is transmitted is determined according to 3GPP TS 36.213 (v15.2.0) section 8.0.

FIG. 5A shows an exemplary RAR Grant format/content for BL/CE UE (CEmodeA and CEmodeB) in the non-EDT case. Similarly, FIG. 5B shows an exemplary RAR Grant format/content for BL/CE UE in the EDT case. A detailed description of each field in these figures is given in 3GPP TS 36.213 (v.15.2.0) section 6.2. In both cases, there is a one-bit CSI request field in CEmodeA by which the eNB can request the UE to report CSI. However, in the contention-based random access (RA) procedure, the CSI request field is reserved (i.e., no values of this field cause the UE to perform any actions).

The Msg3/4 MPDCCH narrowband index indicates the narrowband (e.g., in frequency domain) used for first subframe of MPDCCH configured by Temporary C-RNTI and/or C-RNTI during random access procedure, as given in 3GPP TS 36.213 (v15.2.0) Table 6.2-B. FIGS. 6A and 6B show the definitions of the MAC RAR message fields for BL/CE UEs in CEmodeA and CEmodeB, respectively. These fields are further specified as follows:

R: Reserved bit, set to "0". For a BL UE or a UE in CE, this bit is set to "1" to indicate that an UL Grant in Random Access Response is for EDT.

Timing Advance Command: The Timing Advance Command field indicates the index value $T_A$ (0, 1, 2 . . . 1282) used to control the amount of timing adjustment that the MAC entity has to apply (see subclause 4.2.3 of [2]). The size of the Timing Advance Command field is 11 bits;

UL Grant: The Uplink Grant field indicates the resources to be used on the uplink. Exemplary contents of this field are shown in FIGS. 5A and 5B. As an example, the size of the UL Grant is 20 bits for BL/CE UEs CEmodeA (as illustrated in FIG. 6A), and 12 bits for BL/CE UEs in CEmodeB (as illustrated in FIG. 6B). Although not shown in FIG. 6, the size of UL grant field is 15 bits for NB-IoT UEs.

Temporary C-RNTI: The Temporary C-RNTI field indicates the temporary identity that is used by the MAC entity during random access. The size of this field is 16 bits.

FIGS. 7A and 7B show the Msg3 Transport Block Size (TBS) tables in CEmodeA and CEmodeB, respectively, assuming that early data transmission (EDT) is not configured. If EDT is configured, the UE can send up to 1000 and 936 bits in Msg3 in CEmodeA and CEmodeB, respectively.

As described above, currently CSI reporting is only supported in RRC CONNECTED mode for LTE-M UEs in CEmodeA, using procedures given in 3GPP TS 36.213 (v15.2.0) section 7.2. A BL/CE UE configured with CEmodeB is not expected to be configured with either aperiodic CSI or periodic CSI reporting. For example, the RAR Grant for CEmodeB does not include the CSI request field due to a need to keep the message size as small as possible in view of the extreme coverage conditions associated with UEs in CEmodeB.

Also, since the RAR Grant content needs to be byte-aligned (or octet-aligned), as illustrated in FIGS. 6A and 6B, adding one extra bit to the RAR Grant DCI will cause the message to grow one byte rather than merely one bit. Given the need to keep the message size small for CEmodeB, this is not an attractive solution.

Even so, for channel quality reporting in Msg3, it could be beneficial for the network to have some information about the DL channel quality to facilitate the scheduling in later steps. However, a UE needs time to perform channel-quality-related measurements and convert the measurements to required formats. If the eNB requests the UE to report the channel quality in RAR without giving sufficient time for the UE to perform measurements, then the reported channel quality measurements may be of such poor quality that they may not be useful to the eNB. In other words, relative to a UE in at least adequate coverage, a UE in bad coverage can require additional time to produce a measurement of sufficient quality to aid the eNB in scheduling of later operations of the RA procedure.

Exemplary embodiments of the present disclosure address these and other problems and/or shortcomings of prior solutions by providing flexible mechanisms for a user equipment (UE, e.g., LTE-M UEs) to measure and report channel quality during a RA procedure, e.g., in Msg3. Furthermore, these exemplary embodiments also provide efficient formats for reporting channel quality that reduce and/or minimize the amount of signaling bandwidth required.

In some embodiments, a network node (e.g., eNB) serving a cell can indicate in broadcast system information (SI) that the serving eNB may request UE(s) to report downlink channel quality in a Msg3 subsequent to the UE initiating a random access. UEs receiving such broadcast SI can then be prepared to provide the CSI report within a reasonable time after the eNB makes the request, e.g., in a RAR message. For example, the UE can initiate channel-quality measurements prior to receiving an explicit CSI request in the RAR message.

In some embodiments, the eNB can include additional information in the broadcast SI, such as the CQI table and/or the reporting criteria to be used for the CSI report (e.g., target BLER, measurement based on selected narrowband).

In other embodiments, the network node can indicate in the DCI (e.g., in the MPDCCH that schedules the RAR Grant) that the eNB is expecting some UE(s) to be prepared to report downlink channel quality in Msg3.

In other embodiments, the network node can indicate in the MAC-layer RAR message (shown in FIGS. 6A and 6B), using a reserved bit (labelled "R"), that the eNB is expecting some UE(s) to be prepared to report downlink channel quality in Msg3. For EDT-capable UEs, the R bit is already used to distinguish between the EDT and non-EDT cases, so in these exemplary embodiments the R bit can be redefined to serve a dual purpose. For example, one option is to make it mandatory for UEs to report CSI when EDT is triggered. Another option is to use the CSI request bit in the RAR Grant. Note that this only applies to CEmodeA because the CSI request bit is not available in CEmodeB, as shown in FIGS. 5A and 5B.

In other embodiments, the network node can indicate that if EDT is configured in the cell, the UE should report downlink channel quality in Msg3 by default, e.g., unless otherwise indicated in the RAR Grant. Alternatively, the network node can indicate in the broadcast SI (e.g., by a particular bit) whether Msg3 channel quality reporting is used when EDT is enabled. As such, this would facilitate separate and/or different configurations for CSI reporting for EDT and non-EDT cases.

In other embodiments, a UE can determine whether to report channel quality in Msg3 based on the result of comparing the TBS selected by the UE, from the set of allowed TB sizes indicated by the eNB (e.g., in the RAR Grant, in SI for the EDT case), to a given value X. The value of X may be signaled in higher layer signaling (e.g., RRC, SI broadcast) or predetermined (e.g., specified in the standard). For example, the UE can determine to report channel quality in Msg3 if the selected TB size is greater than X or, alternately, greater than or equal to X.

In other embodiments, a UE can determine to report, in Msg3, DL channel quality for one or more particular narrowbands (e.g., one or more groups of six PRBs) if the TBS selected by the UE from the set of allowed TB sizes indicated by the eNB is larger than a given value Y but smaller than a given value Z. The values of Y and Z may be signaled in higher layer signaling (e.g., RRC, SI broadcast) or predetermined (e.g., specified in the standard).

In other embodiments (e.g., CEmodeA embodiments where a CSI request bit is available in the RAR Grant DCI), the CSI request indicated by eNB in the RAR Grant can temporarily enable or disable the UE's DL channel quality reporting in Msg3. For example, if the eNB does not have resources and/or does not consider channel quality to be necessary for certain UEs, it can indicate in the RAR Grant that the UE does not need to report the channel quality in the UL resource indicated in the RAR Grant as being scheduled for Msg3 transmission.

These embodiments briefly described above can be further illustrated with reference to FIGS. 8-9, which depict exemplary methods and/or procedures performed by a UE and a network node, respectively. Put differently, various features of the operations described below correspond to various embodiments briefly described above.

Figure 8:
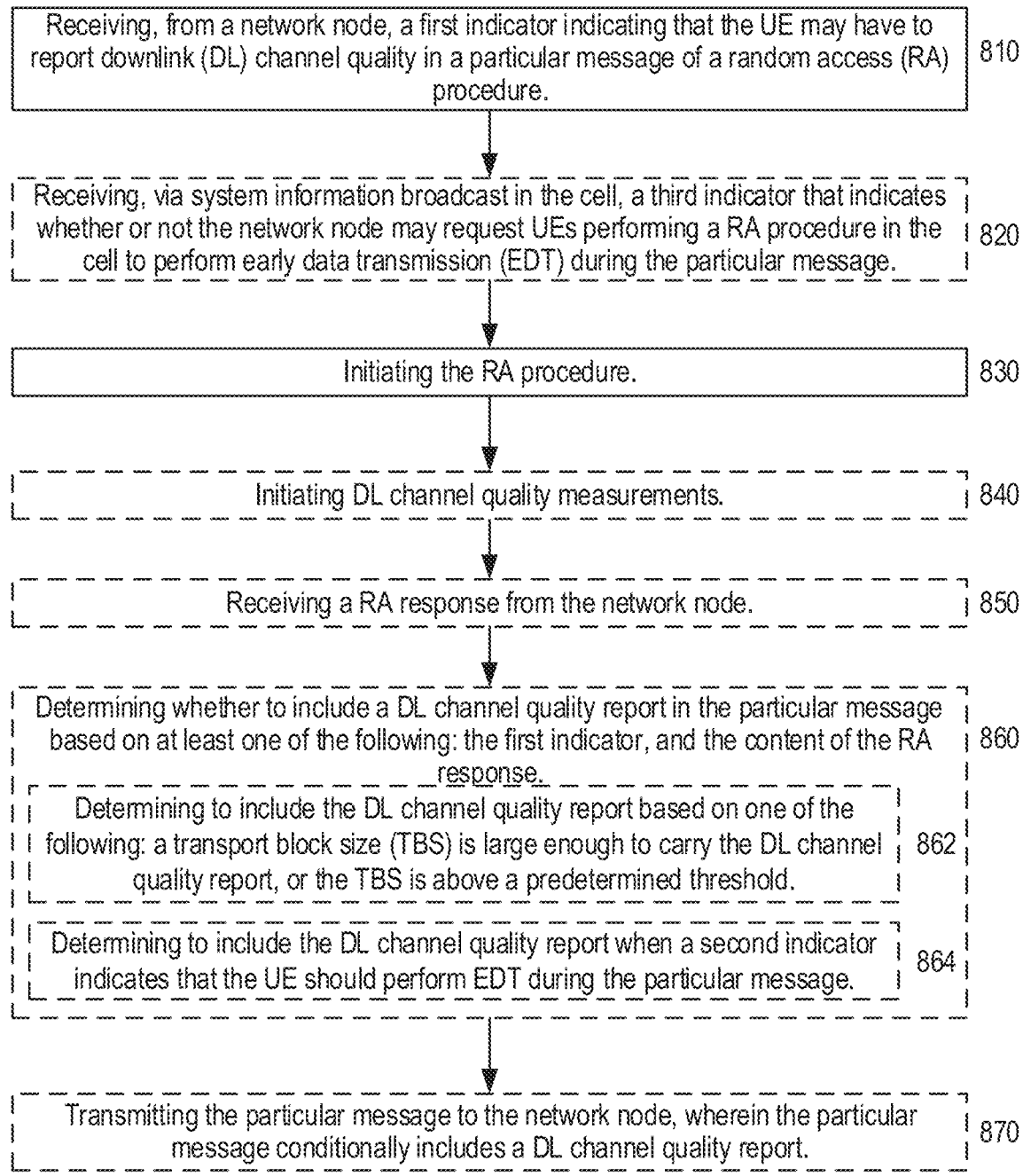
FIG. 8 is a flow diagram illustrating exemplary methods and/or procedures performed by a user equipment (UE, e.g., wireless device, IoT device, MTC device, etc. or component(s) thereof), according to various exemplary embodiments of the present disclosure.

More specifically, FIG. 8 is a flow diagram illustrating an exemplary method and/or procedure to provide downlink (DL) channel-quality reports during a random-access (RA) procedure in a cell provided by a network node in a radio access network (RAN), according to various exemplary embodiments of the present disclosure. The exemplary method and/or procedure can be implemented, for example, by a user equipment (UE, e.g., wireless device, IoT device, MTC device, etc. or component thereof) configured to operate in a coverage-enhancement (CE) mode in the cell. Furthermore, the exemplary method and/or procedure shown in FIG. 8 can be utilized cooperatively with other exemplary method and/or procedures described herein (e.g., FIG. 9) to provide various exemplary benefits described herein. Although FIG. 8 shows blocks in a particular order, this order is merely exemplary, and the operations of the exemplary method and/or procedure can be performed in a different order than shown and can be combined and/or divided into blocks having different functionality than shown. Optional operations are indicated by dashed lines.

The exemplary method and/or procedure illustrated in FIG. 8 can include the operations of block 810, in which the UE can receive, from the network node, a first indicator indicating that the UE may have to report DL channel quality in a particular message of the RA procedure. In some embodiments, the RAN is a Long-Term Evolution (LTE) network and the particular message is a Msg3 of an LTE RA procedure. In some embodiments, the UE can be operating in a particular CE mode, e.g., CEmodeA or CEmodeB. In some embodiments, the first indicator can be received in system information broadcast by the network node. In some embodiments, the first indicator can be received in a RA response from the network node.

In some embodiments, the exemplary method and/or procedure can also include the operations of block 820, in which the UE can receive, via system information broadcast in the cell, a third indicator that indicates whether or not the network node may request UEs performing a RA procedure in the cell to perform early data transmission (EDT) during the particular message.

The exemplary method and/or procedure can also include the operations of block 830, in which the UE can initiate the RA procedure. In some embodiments, the exemplary method and/or procedure can also include the operations of block 840, in which the UE can initiate DL channel quality measurements based on the first indicator. In some embodiments, the exemplary method and/or procedure can also include the operations of block 850, in which the UE can receive a RA response from the network node. In some embodiments, the UE can initiate the DL channel quality measurements (block 840) after initiating the RA procedure (block 830) but before receiving the RA response (block 850).

In some embodiments, the exemplary method and/or procedure can also include the operations of block 860, in which the UE can determine whether to include a DL channel quality report in the particular message based on at least one of the following: the first indicator, and the content of the RA response.

In some embodiments, the RA response (received in block 850) can include a request to report DL channel quality during the particular message. In some embodiments, the RA response can include an uplink (UL) grant of resources for the particular message, with the UL grant including a transport block size (TBS). In such embodiments, the operations of block 860 can include the operations of sub-block 862, where the UE can determine to include the DL channel quality report based on one of the following: the TBS is large enough to carry the DL channel quality report, or the TBS is above a predetermined threshold.

In some embodiments, the RA response can include a second indicator that indicates whether or not the UE should perform early data transmission (EDT) during the particular message. In such embodiments, the operations of block 860 can include the operations of sub-block 864, where the UE can determine to include the DL channel quality report when the second indicator indicates that the UE should perform EDT during the particular message.

In some embodiments, the exemplary method and/or procedure can also include the operations of block 870, in which the UE can transmit the particular message to the network node, wherein the particular message conditionally includes a DL channel quality report. For example, conditions under which the UE includes the DL channel quality report can be determined in block 860 and/or sub-blocks thereof.

Figure 9:
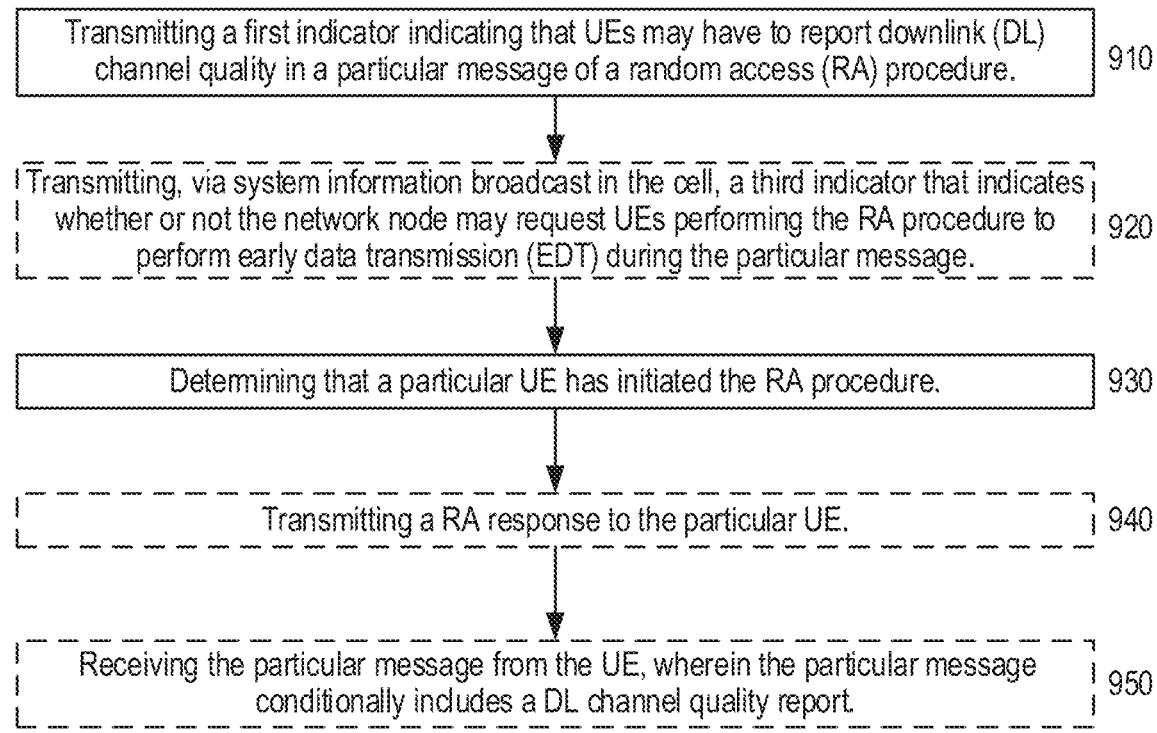
FIG. 9 is a flow diagram illustrating exemplary methods and/or procedures performed by a network node (e.g., base station, eNB, gNB, ng-eNB, etc. or component(s) thereof), according to various exemplary embodiments of the present disclosure.

Furthermore, FIG. 9 is a flow diagram illustrating an exemplary method and/or procedure to enable downlink (DL) channel-quality reports from user equipment (UEs) performing a random-access (RA) procedure, according to various exemplary embodiments of the present disclosure. The exemplary method and/or procedure shown in FIG. 9 can be implemented, for example, by a network node (e.g., eNB, gNB, ng-eNB, or components thereof) configured to provide a cell in a radio access network (RAN). Furthermore, the exemplary method and/or procedure shown in FIG. 9 can be utilized cooperatively with other exemplary methods and/or procedures described herein (e.g., FIG. 8) to provide various exemplary benefits described herein. Although FIG. 9 shows blocks in a particular order, this order is merely exemplary, and the operations of the exemplary method and/or procedure can be performed in a different order than shown and can be combined and/or divided into blocks having different functionality than shown. Optional operations are indicated by dashed lines.

The exemplary method and/or procedure illustrated in FIG. 9 can include the operations of block 910, in which the network node can transmit a first indicator that indicates that the UEs may have to report DL channel quality in a particular message of the RA procedure. This operation can correspond to one or more UEs receiving the first indicator, such as in operation 810 described above.

In some embodiments, one or more of the UEs can be configured to operate in a coverage enhancement (CE) mode, such as described herein. In some embodiments, the RAN can be a Long-Term Evolution (LTE) network and the particular message can be a Msg3 of an LTE RA procedure. In some embodiments, the first indicator can be transmitted in system information broadcast by the network node. In some embodiments, the first indicator can be transmitted in a RA response.

In some embodiments, the exemplary method and/or procedure can also include the operations of block 920, in which the network node can transmit, via system information broadcast in the cell, a third indicator that indicates whether or not the network node may request UEs performing a RA procedure in the cell to perform early data transmission (EDT) during the particular message. This operation can correspond to one or more UEs receiving the third indicator, such as in operation 820 described above.

The exemplary method and/or procedure can also include the operations of block 930, in which the network node can determine that a particular UE has initiated the RA procedure in the cell (e.g., by detecting one or more RA preambles transmitted by the UE). This operation can be responsive to a particular UE initiating a RA procedure, such as in operation 830 described above.

In some embodiments, the exemplary method and/or procedure can also include the operations of block 940, in which the network node can transmit a RA response to the UE. This operation can correspond to the UE receiving the RA response, such as in operation 850 described above.

In some embodiments, the exemplary method and/or procedure can also include the operations of block 950, in which the network node can receive the particular message from the particular UE, wherein the particular message conditionally includes a DL channel quality report. This operation can correspond to the particular UE transmitting the particular message, such as in operation 870 described above. In some embodiments, the conditions under which the DL channel quality report are included can be based on at least one of the following: the first indicator, and the content of the RA response.

In some embodiments, the RA response (transmitted in block 940) can include a request for the UE to report DL channel quality during the particular message. In some embodiments, the RA response can include an uplink (UL) grant of resources for the particular message, with the UL grant including a transport block size (TBS). In such embodiments, the particular message can include the DL channel quality report when at least one of the following is true: the TBS is large enough to carry the DL channel quality report, or the TBS is above a predetermined threshold.

In some embodiments, the RA response can include a second indicator that indicates whether or not the UE should perform early data transmission (EDT) during the particular message. In such embodiments, the particular message can include the DL channel quality report when the second indicator indicates that the UE should perform EDT during the particular message.

Figure 10:
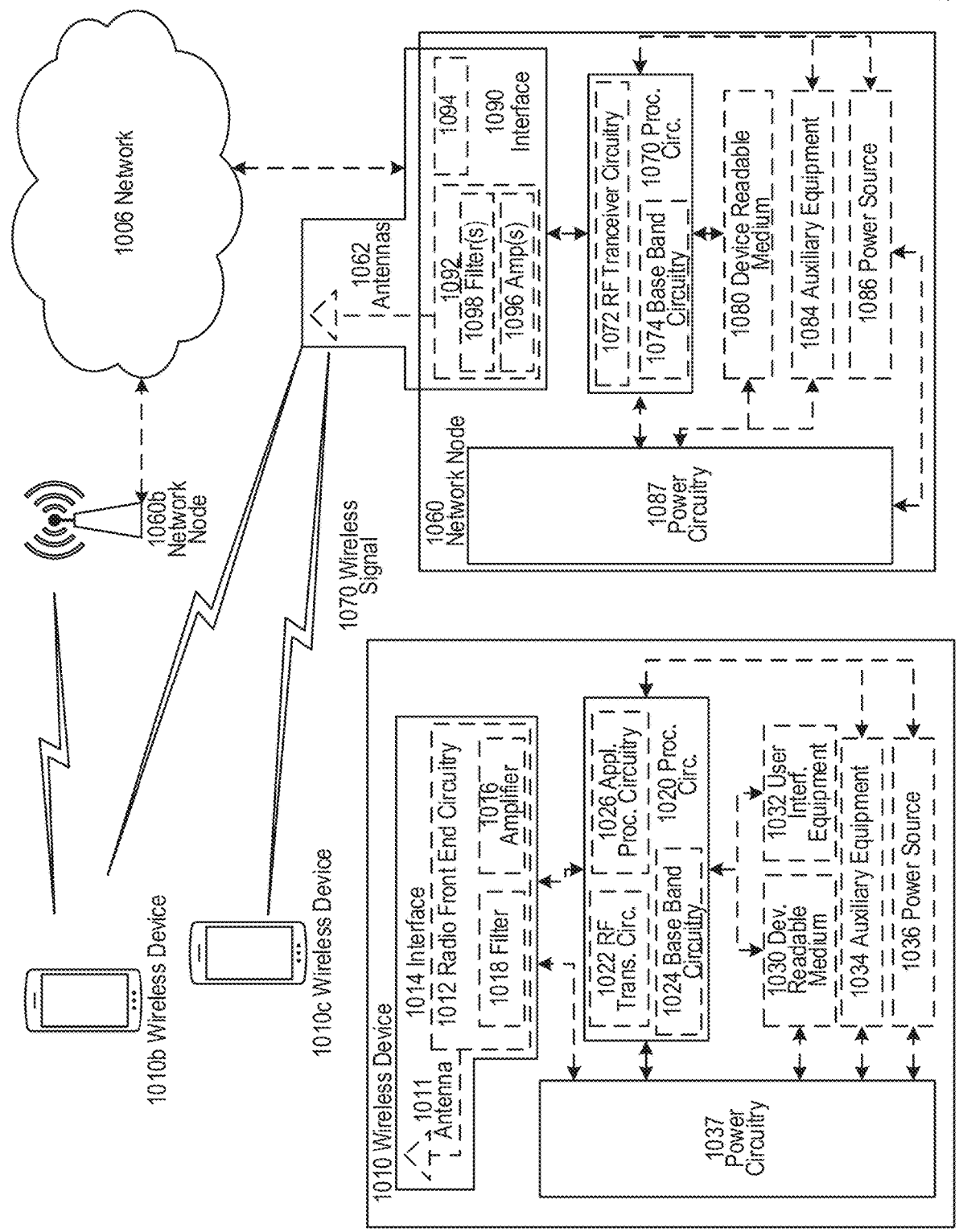
FIG. 10 illustrates an exemplary embodiment of a wireless network, according to various exemplary embodiments of the present disclosure.

Although the subject matter described herein can be implemented in any appropriate type of system using any suitable components, the embodiments disclosed herein are described in relation to a wireless network, such as the example wireless network illustrated in FIG. 10. For simplicity, the wireless network of FIG. 10 only depicts network 1006, network nodes 1060 and 1060b, and WDs 1010, 1010b, and 1010c. In practice, a wireless network can further include any additional elements suitable to support communication between wireless devices or between a wireless device and another communication device, such as a landline telephone, a service provider, or any other network node or end device. Of the illustrated components, network node 1060 and wireless device (WD) 1010 are depicted with additional detail. The wireless network can provide communication and other types of services to one or more wireless devices to facilitate the wireless devices' access to and/or use of the services provided by, or via, the wireless network.

The wireless network can comprise and/or interface with any type of communication, telecommunication, data, cellular, and/or radio network or other similar type of system. In some embodiments, the wireless network can be configured to operate according to specific standards or other types of predefined rules or procedures. Thus, particular embodiments of the wireless network can implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1006 can comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1060 and WD 1010 comprise various components described in more detail below. These components work together in order to provide network node and/or wireless device functionality, such as providing wireless connections in a wireless network. In different embodiments, the wireless network can comprise any number of wired or wireless networks, network nodes, base stations, controllers, wireless devices, relay stations, and/or any other components or systems that can facilitate or participate in the communication of data and/or signals whether via wired or wireless connections.

Examples of network nodes include, but are not limited to, access points (APs) (e.g., radio access points), base stations (BSs) (e.g., radio base stations, NBs, eNBs, gNBs, or components thereof). Base stations can be categorized based on the amount of coverage they provide (or, stated differently, their transmit power level) and can then also be referred to as femto base stations, pico base stations, micro base stations, or macro base stations. A base station can be a relay node or a relay donor node controlling a relay. A network node can also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station can also be referred to as nodes in a distributed antenna system (DAS).

Further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node can be a virtual network node as described in more detail below.

In FIG. 10, network node 1060 includes processing circuitry 1070, device readable medium 1080, interface 1090, auxiliary equipment 1084, power source 1086, power circuitry 1087, and antenna 1062. Although network node 1060 illustrated in the example wireless network of FIG. 10 can represent a device that includes the illustrated combination of hardware components, other embodiments can comprise network nodes with different combinations of components. It is to be understood that a network node comprises any suitable combination of hardware and/or software needed to perform the tasks, features, functions and methods and/or procedures disclosed herein. Moreover, while the components of network node 1060 are depicted as single boxes located within a larger box, or nested within multiple boxes, in practice, a network node can comprise multiple different physical components that make up a single illustrated component (e.g., device readable medium 1080 can comprise multiple separate hard drives as well as multiple RAM modules).

Similarly, network node 1060 can be composed of multiple physically separate components (e.g., a NodeB component and a RNC component, or a BTS component and a BSC component, etc.), which can each have their own respective components. In certain scenarios in which network node 1060 comprises multiple separate components (e.g., BTS and BSC components), one or more of the separate components can be shared among several network nodes. For example, a single RNC can control multiple NodeB's. In such a scenario, each unique NodeB and RNC pair, can in some instances be considered a single separate network node. In some embodiments, network node 1060 can be configured to support multiple radio access technologies (RATs). In such embodiments, some components can be duplicated (e.g., separate device readable medium 1080 for the different RATs) and some components can be reused (e.g., the same antenna 1062 can be shared by the RATs). Network node 1060 can also include multiple sets of the various illustrated components for different wireless technologies integrated into network node 1060, such as, for example, GSM, WCDMA, LTE, NR, WiFi, or Bluetooth wireless technologies. These wireless technologies can be integrated into the same or different chip or set of chips and other components within network node 1060.

Processing circuitry 1070 can be configured to perform any determining, calculating, or similar operations (e.g., certain obtaining operations) described herein as being provided by a network node. These operations performed by processing circuitry 1070 can include processing information obtained by processing circuitry 1070 by, for example, converting the obtained information into other information, comparing the obtained information or converted information to information stored in the network node, and/or performing one or more operations based on the obtained information or converted information, and as a result of said processing making a determination.

Processing circuitry 1070 can comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1060 components, such as device readable medium 1080, network node 1060 functionality. For example, processing circuitry 1070 can execute instructions stored in device readable medium 1080 or in memory within processing circuitry 1070. Such functionality can include providing any of the various wireless features, functions, or benefits discussed herein. In some embodiments, processing circuitry 1070 can include a system on a chip (SOC).

In some embodiments, processing circuitry 1070 can include one or more of radio frequency (RF) transceiver circuitry 1072 and baseband processing circuitry 1074. In some embodiments, radio frequency (RF) transceiver circuitry 1072 and baseband processing circuitry 1074 can be on separate chips (or sets of chips), boards, or units, such as radio units and digital units. In alternative embodiments, part or all of RF transceiver circuitry 1072 and baseband processing circuitry 1074 can be on the same chip or set of chips, boards, or units In certain embodiments, some or all of the functionality described herein as being provided by a network node, base station, eNB or other such network device can be performed by processing circuitry 1070 executing instructions stored on device readable medium 1080 or memory within processing circuitry 1070. In alternative embodiments, some or all of the functionality can be provided by processing circuitry 1070 without executing instructions stored on a separate or discrete device readable medium, such as in a hard-wired manner In any of those embodiments, whether executing instructions stored on a device readable storage medium or not, processing circuitry 1070 can be configured to perform the described functionality. The benefits provided by such functionality are not limited to processing circuitry 1070 alone or to other components of network node 1060, but are enjoyed by network node 1060 as a whole, and/or by end users and the wireless network generally.

Device readable medium 1080 can comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that can be used by processing circuitry 1070. Device readable medium 1080 can store any suitable instructions, data or information, including a computer program, software, an application including one or more of logic, rules, code, tables, etc. and/or other instructions capable of being executed by processing circuitry 1070 and, utilized by network node 1060. Device readable medium 1080 can be used to store any calculations made by processing circuitry 1070 and/or any data received via interface 1090. In some embodiments, processing circuitry 1070 and device readable medium 1080 can be considered to be integrated.

Interface 1090 is used in the wired or wireless communication of signalling and/or data between network node 1060, network 1006, and/or WDs 1010. As illustrated, interface 1090 comprises port(s)/terminal(s) 1094 to send and receive data, for example to and from network 1006 over a wired connection. Interface 1090 also includes radio front end circuitry 1092 that can be coupled to, or in certain embodiments a part of, antenna 1062. Radio front end circuitry 1092 comprises filters 1098 and amplifiers 1096. Radio front end circuitry 1092 can be connected to antenna 1062 and processing circuitry 1070. Radio front end circuitry can be configured to condition signals communicated between antenna 1062 and processing circuitry 1070. Radio front end circuitry 1092 can receive digital data that is to be sent out to other network nodes or WDs via a wireless connection. Radio front end circuitry 1092 can convert the digital data into a radio signal having the appropriate channel and bandwidth parameters using a combination of filters 1098 and/or amplifiers 1096. The radio signal can then be transmitted via antenna 1062. Similarly, when receiving data, antenna 1062 can collect radio signals which are then converted into digital data by radio front end circuitry 1092. The digital data can be passed to processing circuitry 1070. In other embodiments, the interface can comprise different components and/or different combinations of components.

In certain alternative embodiments, network node 1060 may not include separate radio front end circuitry 1092, instead, processing circuitry 1070 can comprise radio front end circuitry and can be connected to antenna 1062 without separate radio front end circuitry 1092. Similarly, in some embodiments, all or some of RF transceiver circuitry 1072 can be considered a part of interface 1090. In still other embodiments, interface 1090 can include one or more ports or terminals 1094, radio front end circuitry 1092, and RF transceiver circuitry 1072, as part of a radio unit (not shown), and interface 1090 can communicate with baseband processing circuitry 1074, which is part of a digital unit (not shown).

Antenna 1062 can include one or more antennas, or antenna arrays, configured to send and/or receive wireless signals. Antenna 1062 can be coupled to radio front end circuitry 1090 and can be any type of antenna capable of transmitting and receiving data and/or signals wirelessly. In some embodiments, antenna 1062 can comprise one or more omni-directional, sector or panel antennas operable to transmit/receive radio signals between, for example, 2 GHz and 66 GHz. An omni-directional antenna can be used to transmit/receive radio signals in any direction, a sector antenna can be used to transmit/receive radio signals from devices within a particular area, and a panel antenna can be a line of sight antenna used to transmit/receive radio signals in a relatively straight line. In some instances, the use of more than one antenna can be referred to as MIMO. In certain embodiments, antenna 1062 can be separate from network node 1060 and can be connectable to network node 1060 through an interface or port.

Antenna 1062, interface 1090, and/or processing circuitry 1070 can be configured to perform any receiving operations and/or certain obtaining operations described herein as being performed by a network node. Any information, data and/or signals can be received from a wireless device, another network node and/or any other network equipment. Similarly, antenna 1062, interface 1090, and/or processing circuitry 1070 can be configured to perform any transmitting operations described herein as being performed by a network node. Any information, data and/or signals can be transmitted to a wireless device, another network node and/or any other network equipment.

Power circuitry 1087 can comprise, or be coupled to, power management circuitry and can be configured to supply the components of network node 1060 with power for performing the functionality described herein. Power circuitry 1087 can receive power from power source 1086. Power source 1086 and/or power circuitry 1087 can be configured to provide power to the various components of network node 1060 in a form suitable for the respective components (e.g., at a voltage and current level needed for each respective component). Power source 1086 can either be included in, or external to, power circuitry 1087 and/or network node 1060. For example, network node 1060 can be connectable to an external power source (e.g., an electricity outlet) via an input circuitry or interface such as an electrical cable, whereby the external power source supplies power to power circuitry 1087. As a further example, power source 1086 can comprise a source of power in the form of a battery or battery pack which is connected to, or integrated in, power circuitry 1087. The battery can provide backup power should the external power source fail. Other types of power sources, such as photovoltaic devices, can also be used.

Alternative embodiments of network node 1060 can include additional components beyond those shown in FIG. 10 that can be responsible for providing certain aspects of the network node's functionality, including any of the functionality described herein and/or any functionality necessary to support the subject matter described herein. For example, network node 1060 can include user interface equipment to allow and/or facilitate input of information into network node 1060 and to allow and/or facilitate output of information from network node 1060. This can allow and/or facilitate a user to perform diagnostic, maintenance, repair, and other administrative functions for network node 1060.

In some embodiments, a wireless device (WD, e.g. WD 1010) can be configured to transmit and/or receive information without direct human interaction. For instance, a WD can be designed to transmit information to a network on a predetermined schedule, when triggered by an internal or external event, or in response to requests from the network. Examples of a WD include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc.

A WD can support device-to-device (D2D) communication, for example by implementing a 3GPP standard for sidelink communication, vehicle-to-vehicle (V2V), vehicle-to-infrastructure (V2I), vehicle-to-everything (V2X) and can in this case be referred to as a D2D communication device. As yet another specific example, in an Internet of Things (IoT) scenario, a WD can represent a machine or other device that performs monitoring and/or measurements, and transmits the results of such monitoring and/or measurements to another WD and/or a network node. The WD can in this case be a machine-to-machine (M2M) device, which can in a 3GPP context be referred to as an MTC device. As one particular example, the WD can be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD can represent a vehicle or other equipment that is capable of monitoring and/or reporting on its operational status or other functions associated with its operation. A WD as described above can represent the endpoint of a wireless connection, in which case the device can be referred to as a wireless terminal. Furthermore, a WD as described above can be mobile, in which case it can also be referred to as a mobile device or a mobile terminal.

As illustrated, wireless device 1010 includes antenna 1011, interface 1014, processing circuitry 1020, device readable medium 1030, user interface equipment 1032, auxiliary equipment 1034, power source 1036 and power circuitry 1037. WD 1010 can include multiple sets of one or more of the illustrated components for different wireless technologies supported by WD 1010, such as, for example, GSM, WCDMA, LTE, NR, WiFi, WiMAX, or Bluetooth wireless technologies, just to mention a few. These wireless technologies can be integrated into the same or different chips or set of chips as other components within WD 1010.

Antenna 1011 can include one or more antennas or antenna arrays, configured to send and/or receive wireless signals, and is connected to interface 1014. In certain alternative embodiments, antenna 1011 can be separate from WD 1010 and be connectable to WD 1010 through an interface or port. Antenna 1011, interface 1014, and/or processing circuitry 1020 can be configured to perform any receiving or transmitting operations described herein as being performed by a WD. Any information, data and/or signals can be received from a network node and/or another WD. In some embodiments, radio front end circuitry and/or antenna 1011 can be considered an interface.

As illustrated, interface 1014 comprises radio front end circuitry 1012 and antenna 1011. Radio front end circuitry 1012 comprise one or more filters 1018 and amplifiers 1016. Radio front end circuitry 1014 is connected to antenna 1011 and processing circuitry 1020, and can be configured to condition signals communicated between antenna 1011 and processing circuitry 1020. Radio front end circuitry 1012 can be coupled to or a part of antenna 1011. In some embodiments, WD 1010 may not include separate radio front end circuitry 1012; rather, processing circuitry 1020 can comprise radio front end circuitry and can be connected to antenna 1011. Similarly, in some embodiments, some or all of RF transceiver circuitry 1022 can be considered a part of interface 1014. Radio front end circuitry 1012 can receive digital data that is to be sent out to other network nodes or WDs via a wireless connection. Radio front end circuitry 1012 can convert the digital data into a radio signal having the appropriate channel and bandwidth parameters using a combination of filters 1018 and/or amplifiers 1016. The radio signal can then be transmitted via antenna 1011. Similarly, when receiving data, antenna 1011 can collect radio signals which are then converted into digital data by radio front end circuitry 1012. The digital data can be passed to processing circuitry 1020. In other embodiments, the interface can comprise different components and/or different combinations of components.

Processing circuitry 1020 can comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1010 components, such as device readable medium 1030, WD 1010 functionality. Such functionality can include providing any of the various wireless features or benefits discussed herein. For example, processing circuitry 1020 can execute instructions stored in device readable medium 1030 or in memory within processing circuitry 1020 to provide the functionality disclosed herein.

As illustrated, processing circuitry 1020 includes one or more of RF transceiver circuitry 1022, baseband processing circuitry 1024, and application processing circuitry 1026. In other embodiments, the processing circuitry can comprise different components and/or different combinations of components. In certain embodiments processing circuitry 1020 of WD 1010 can comprise a SOC. In some embodiments, RF transceiver circuitry 1022, baseband processing circuitry 1024, and application processing circuitry 1026 can be on separate chips or sets of chips. In alternative embodiments, part or all of baseband processing circuitry 1024 and application processing circuitry 1026 can be combined into one chip or set of chips, and RF transceiver circuitry 1022 can be on a separate chip or set of chips. In still alternative embodiments, part or all of RF transceiver circuitry 1022 and baseband processing circuitry 1024 can be on the same chip or set of chips, and application processing circuitry 1026 can be on a separate chip or set of chips. In yet other alternative embodiments, part or all of RF transceiver circuitry 1022, baseband processing circuitry 1024, and application processing circuitry 1026 can be combined in the same chip or set of chips. In some embodiments, RF transceiver circuitry 1022 can be a part of interface 1014. RF transceiver circuitry 1022 can condition RF signals for processing circuitry 1020.

In certain embodiments, some or all of the functionality described herein as being performed by a WD can be provided by processing circuitry 1020 executing instructions stored on device readable medium 1030, which in certain embodiments can be a computer-readable storage medium. In alternative embodiments, some or all of the functionality can be provided by processing circuitry 1020 without executing instructions stored on a separate or discrete device readable storage medium, such as in a hard-wired manner In any of those particular embodiments, whether executing instructions stored on a device readable storage medium or not, processing circuitry 1020 can be configured to perform the described functionality. The benefits provided by such functionality are not limited to processing circuitry 1020 alone or to other components of WD 1010, but are enjoyed by WD 1010 as a whole, and/or by end users and the wireless network generally.

Processing circuitry 1020 can be configured to perform any determining, calculating, or similar operations (e.g., certain obtaining operations) described herein as being performed by a WD. These operations, as performed by processing circuitry 1020, can include processing information obtained by processing circuitry 1020 by, for example, converting the obtained information into other information, comparing the obtained information or converted information to information stored by WD 1010, and/or performing one or more operations based on the obtained information or converted information, and as a result of said processing making a determination.

Device readable medium 1030 can be operable to store a computer program, software, an application including one or more of logic, rules, code, tables, etc. and/or other instructions capable of being executed by processing circuitry 1020. Device readable medium 1030 can include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that can be used by processing circuitry 1020. In some embodiments, processing circuitry 1020 and device readable medium 1030 can be considered to be integrated.

User interface equipment 1032 can include components that allow and/or facilitate a human user to interact with WD 1010. Such interaction can be of many forms, such as visual, audial, tactile, etc. User interface equipment 1032 can be operable to produce output to the user and to allow and/or facilitate the user to provide input to WD 1010. The type of interaction can vary depending on the type of user interface equipment 1032 installed in WD 1010. For example, if WD 1010 is a smart phone, the interaction can be via a touch screen; if WD 1010 is a smart meter, the interaction can be through a screen that provides usage (e.g., the number of gallons used) or a speaker that provides an audible alert (e.g., if smoke is detected). User interface equipment 1032 can include input interfaces, devices and circuits, and output interfaces, devices and circuits. User interface equipment 1032 can be configured to allow and/or facilitate input of information into WD 1010, and is connected to processing circuitry 1020 to allow and/or facilitate processing circuitry 1020 to process the input information. User interface equipment 1032 can include, for example, a microphone, a proximity or other sensor, keys/buttons, a touch display, one or more cameras, a USB port, or other input circuitry. User interface equipment 1032 is also configured to allow and/or facilitate output of information from WD 1010, and to allow and/or facilitate processing circuitry 1020 to output information from WD 1010. User interface equipment 1032 can include, for example, a speaker, a display, vibrating circuitry, a USB port, a headphone interface, or other output circuitry. Using one or more input and output interfaces, devices, and circuits, of user interface equipment 1032, WD 1010 can communicate with end users and/or the wireless network, and allow and/or facilitate them to benefit from the functionality described herein.

Auxiliary equipment 1034 is operable to provide more specific functionality which may not be generally performed by WDs. This can comprise specialized sensors for doing measurements for various purposes, interfaces for additional types of communication such as wired communications etc. The inclusion and type of components of auxiliary equipment 1034 can vary depending on the embodiment and/or scenario.

Power source 1036 can, in some embodiments, be in the form of a battery or battery pack. Other types of power sources, such as an external power source (e.g., an electricity outlet), photovoltaic devices or power cells, can also be used. WD 1010 can further comprise power circuitry 1037 for delivering power from power source 1036 to the various parts of WD 1010 which need power from power source 1036 to carry out any functionality described or indicated herein. Power circuitry 1037 can in certain embodiments comprise power management circuitry. Power circuitry 1037 can additionally or alternatively be operable to receive power from an external power source; in which case WD 1010 can be connectable to the external power source (such as an electricity outlet) via input circuitry or an interface such as an electrical power cable. Power circuitry 1037 can also in certain embodiments be operable to deliver power from an external power source to power source 1036. This can be, for example, for the charging of power source 1036. Power circuitry 1037 can perform any converting or other modification to the power from power source 1036 to make it suitable for supply to the respective components of WD 1010.

Figure 11:
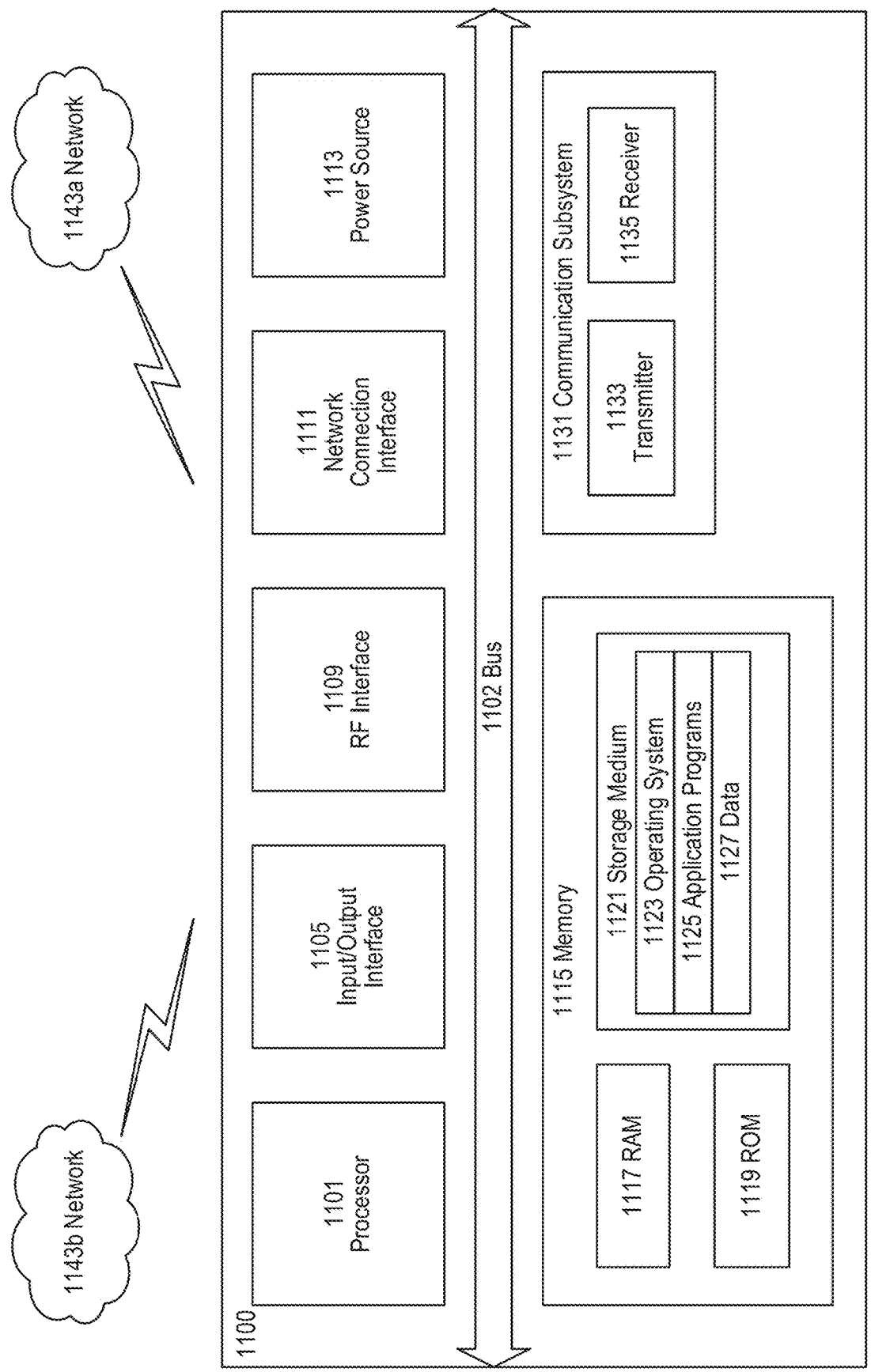
FIG. 11 is a block diagram illustrating an exemplary embodiment of a UE, according to various exemplary embodiments of the present disclosure.

FIG. 11 illustrates one embodiment of a UE in accordance with various aspects described herein. As used herein, a user equipment or UE may not necessarily have a user in the sense of a human user who owns and/or operates the relevant device. Instead, a UE can represent a device that is intended for sale to, or operation by, a human user but which may not, or which may not initially, be associated with a specific human user (e.g., a smart sprinkler controller). Alternatively, a UE can represent a device that is not intended for sale to, or operation by, an end user but which can be associated with or operated for the benefit of a user (e.g., a smart power meter). UE 11200 can be any UE identified by the $3^{rd}$ Generation Partnership Project (3GPP), including a NB-IoT UE, a machine type communication (MTC) UE, and/or an enhanced MTC (eMTC) UE. UE 1100, as illustrated in FIG. 11, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE can be used interchangeable. Accordingly, although FIG. 11 is a UE, the components discussed herein are equally applicable to a WD, and vice-versa.

In FIG. 11, UE 1100 includes processing circuitry 1101 that is operatively coupled to input/output interface 1105, radio frequency (RF) interface 1109, network connection interface 1111, memory 1115 including random access memory (RAM) 1117, read-only memory (ROM) 1119, and storage medium 1121 or the like, communication subsystem 1131, power source 1133, and/or any other component, or any combination thereof. Storage medium 1121 includes operating system 1123, application program 1125, and data 1127. In other embodiments, storage medium 1121 can include other similar types of information. Certain UEs can utilize all of the components shown in FIG. 11, or only a subset of the components. The level of integration between the components can vary from one UE to another UE. Further, certain UEs can contain multiple instances of a component, such as multiple processors, memories, transceivers, transmitters, receivers, etc.

In FIG. 11, processing circuitry 1101 can be configured to process computer instructions and data. Processing circuitry 1101 can be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1101 can include two central processing units (CPUs). Data can be information in a form suitable for use by a computer.

In the depicted embodiment, input/output interface 1105 can be configured to provide a communication interface to an input device, output device, or input and output device. UE 1100 can be configured to use an output device via input/output interface 1105. An output device can use the same type of interface port as an input device. For example, a USB port can be used to provide input to and output from UE 1100. The output device can be a speaker, a sound card, a video card, a display, a monitor, a printer, an actuator, an emitter, a smartcard, another output device, or any combination thereof. UE 1100 can be configured to use an input device via input/output interface 1105 to allow and/or facilitate a user to capture information into UE 1100. The input device can include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display can include a capacitive or resistive touch sensor to sense input from a user. A sensor can be, for instance, an accelerometer, a gyroscope, a tilt sensor, a force sensor, a magnetometer, an optical sensor, a proximity sensor, another like sensor, or any combination thereof. For example, the input device can be an accelerometer, a magnetometer, a digital camera, a microphone, and an optical sensor.

In FIG. 11, RF interface 1109 can be configured to provide a communication interface to RF components such as a transmitter, a receiver, and an antenna. Network connection interface 1111 can be configured to provide a communication interface to network 1143*a*. Network 1143*a* can encompass wired and/or wireless networks such as a local-area network (LAN), a wide-area network (WAN), a computer network, a wireless network, a telecommunications network, another like network or any combination thereof. For example, network 1143*a* can comprise a Wi-Fi network. Network connection interface 1111 can be configured to include a receiver and a transmitter interface used to communicate with one or more other devices over a communication network according to one or more communication protocols, such as Ethernet, TCP/IP, SONET, ATM, or the like. Network connection interface 1111 can implement receiver and transmitter functionality appropriate to the communication network links (e.g., optical, electrical, and the like). The transmitter and receiver functions can share circuit components, software or firmware, or alternatively can be implemented separately.

RAM 1117 can be configured to interface via bus 1102 to processing circuitry 1101 to provide storage or caching of data or computer instructions during the execution of software programs such as the operating system, application programs, and device drivers. ROM 1119 can be configured to provide computer instructions or data to processing circuitry 1101. For example, ROM 1119 can be configured to store invariant low-level system code or data for basic system functions such as basic input and output (I/O), startup, or reception of keystrokes from a keyboard that are stored in a non-volatile memory. Storage medium 1121 can be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1121 can be configured to include operating system 1123, application program 1125 such as a web browser application, a widget or gadget engine or another application, and data file 1127. Storage medium 1121 can store, for use by UE 1100, any of a variety of various operating systems or combinations of operating systems.

Storage medium 1121 can be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1121 can allow and/or facilitate UE 1100 to access computer-executable instructions, application programs or the like, stored on transitory or non-transitory memory media, to off-load data, or to upload data. An article of manufacture, such as one utilizing a communication system can be tangibly embodied in storage medium 1121, which can comprise a device readable medium.

In FIG. 11, processing circuitry 1101 can be configured to communicate with network 1143*b* using communication subsystem 1131. Network 1143*a* and network 1143*b* can be the same network or networks or different network or networks. Communication subsystem 1131 can be configured to include one or more transceivers used to communicate with network 1143*b*. For example, communication subsystem 1131 can be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver can include transmitter 1133 and/or receiver 1135 to implement transmitter or receiver functionality, respectively, appropriate to the RAN links (e.g., frequency allocations and the like). Further, transmitter 1133 and receiver 1135 of each transceiver can share circuit components, software or firmware, or alternatively can be implemented separately.

In the illustrated embodiment, the communication functions of communication subsystem 1131 can include data communication, voice communication, multimedia communication, short-range communications such as Bluetooth, near-field communication, location-based communication such as the use of the global positioning system (GPS) to determine a location, another like communication function, or any combination thereof. For example, communication subsystem 1131 can include cellular communication, Wi-Fi communication, Bluetooth communication, and GPS communication. Network 1143*b* can encompass wired and/or wireless networks such as a local-area network (LAN), a wide-area network (WAN), a computer network, a wireless network, a telecommunications network, another like network or any combination thereof. For example, network 1143*b* can be a cellular network, a Wi-Fi network, and/or a near-field network. Power source 1113 can be configured to provide alternating current (AC) or direct current (DC) power to components of UE 1100.

The features, benefits and/or functions described herein can be implemented in one of the components of UE 1100 or partitioned across multiple components of UE 1100. Further, the features, benefits, and/or functions described herein can be implemented in any combination of hardware, software or firmware. In one example, communication subsystem 1131 can be configured to include any of the components described herein. Further, processing circuitry 1101 can be configured to communicate with any of such components over bus 1102. In another example, any of such components can be represented by program instructions stored in memory that when executed by processing circuitry 1101 perform the corresponding functions described herein. In another example, the functionality of any of such components can be partitioned between processing circuitry 1101 and communication subsystem 1131. In another example, the non-computationally intensive functions of any of such components can be implemented in software or firmware and the computationally intensive functions can be implemented in hardware.

Figure 12:
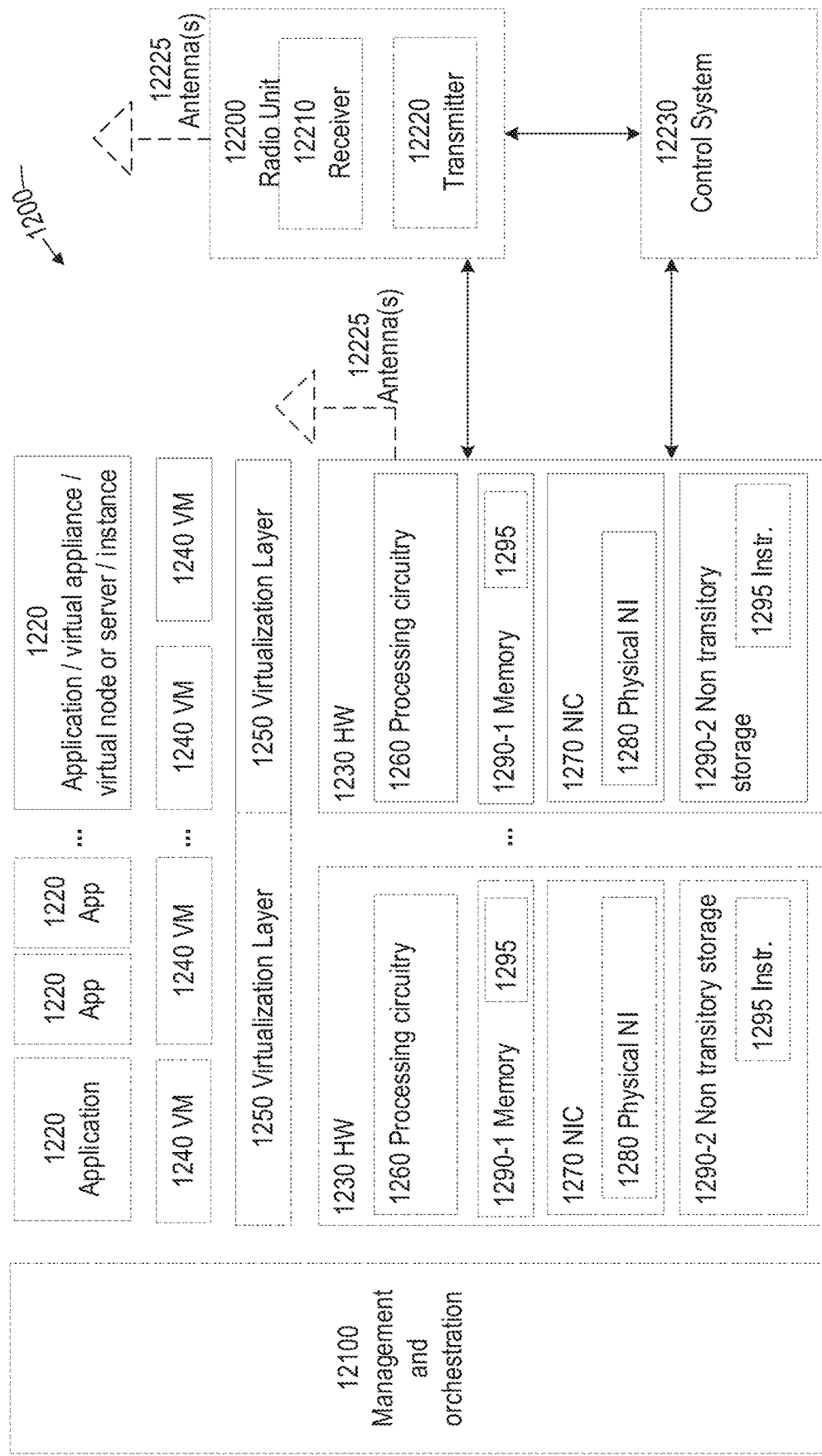
FIG. 12 is a block diagram illustrating an exemplary virtualization environment usable for implementation of various embodiments of network nodes described herein.

FIG. 12 is a schematic block diagram illustrating a virtualization environment 1200 in which functions implemented by some embodiments can be virtualized. In the present context, virtualizing means creating virtual versions of apparatuses or devices which can include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein can be implemented as virtual components executed by one or more virtual machines implemented in one or more virtual environments 1200 hosted by one or more of hardware nodes 1230. Further, in embodiments in which the virtual node is not a radio access node or does not require radio connectivity (e.g., a core network node), then the network node can be entirely virtualized.

The functions can be implemented by one or more applications 1220 (which can alternatively be called software instances, virtual appliances, network functions, virtual nodes, virtual network functions, etc.) operative to implement some of the features, functions, and/or benefits of some of the embodiments disclosed herein. Applications 1220 are run in virtualization environment 1200 which provides hardware 1230 comprising processing circuitry 1260 and memory 1290. Memory 1290 contains instructions 1295 executable by processing circuitry 1260 whereby application 1220 is operative to provide one or more of the features, benefits, and/or functions disclosed herein.

Virtualization environment 1200, comprises general-purpose or special-purpose network hardware devices 1230 comprising a set of one or more processors or processing circuitry 1260, which can be commercial off-the-shelf (COTS) processors, dedicated Application Specific Integrated Circuits (ASICs), or any other type of processing circuitry including digital or analog hardware components or special purpose processors. Each hardware device can comprise memory 1290-1 which can be non-persistent memory for temporarily storing instructions 1295 or software executed by processing circuitry 1260. Each hardware device can comprise one or more network interface controllers (NICs) 1270, also known as network interface cards, which include physical network interface 1280. Each hardware device can also include non-transitory, persistent, machine-readable storage media 1290-2 having stored therein software 1295 and/or instructions executable by processing circuitry 1260. Software 1295 can include any type of software including software for instantiating one or more virtualization layers 1250 (also referred to as hypervisors), software to execute virtual machines 1240 as well as software allowing it to execute functions, features and/or benefits described in relation with some embodiments described herein.

Virtual machines 1240, comprise virtual processing, virtual memory, virtual networking or interface and virtual storage, and can be run by a corresponding virtualization layer 1250 or hypervisor. Different embodiments of the instance of virtual appliance 1220 can be implemented on one or more of virtual machines 1240, and the implementations can be made in different ways.

During operation, processing circuitry 1260 executes software 1295 to instantiate the hypervisor or virtualization layer 1250, which can sometimes be referred to as a virtual machine monitor (VMM). Virtualization layer 1250 can present a virtual operating platform that appears like networking hardware to virtual machine 1240.

As shown in FIG. 12, hardware 1230 can be a standalone network node with generic or specific components. Hardware 1230 can comprise antenna 12225 and can implement some functions via virtualization. Alternatively, hardware 1230 can be part of a larger cluster of hardware (e.g., such as in a data center or customer premise equipment (CPE)) where many hardware nodes work together and are managed via management and orchestration (MANO) 12100, which, among others, oversees lifecycle management of applications 1220.

Virtualization of the hardware is in some contexts referred to as network function virtualization (NFV). NFV can be used to consolidate many network equipment types onto industry standard high volume server hardware, physical switches, and physical storage, which can be located in data centers, and customer premise equipment.

In the context of NFV, virtual machine 1240 can be a software implementation of a physical machine that runs programs as if they were executing on a physical, non-virtualized machine. Each of virtual machines 1240, and that part of hardware 1230 that executes that virtual machine, be it hardware dedicated to that virtual machine and/or hardware shared by that virtual machine with others of the virtual machines 1240, forms a separate virtual network elements (VNE).

Still in the context of NFV, Virtual Network Function (VNF) is responsible for handling specific network functions that run in one or more virtual machines 1240 on top of hardware networking infrastructure 1230 and corresponds to application 1220 in FIG. 12.

In some embodiments, one or more radio units 12200 that each include one or more transmitters 12220 and one or more receivers 12210 can be coupled to one or more antennas 12225. Radio units 12200 can communicate directly with hardware nodes 1230 via one or more appropriate network interfaces and can be used in combination with the virtual components to provide a virtual node with radio capabilities, such as a radio access node or a base station.

In some embodiments, some signalling can be effected by control system 12230 which can alternatively be used for communication between the hardware nodes 1230 and radio units 12200.

Figure 13:
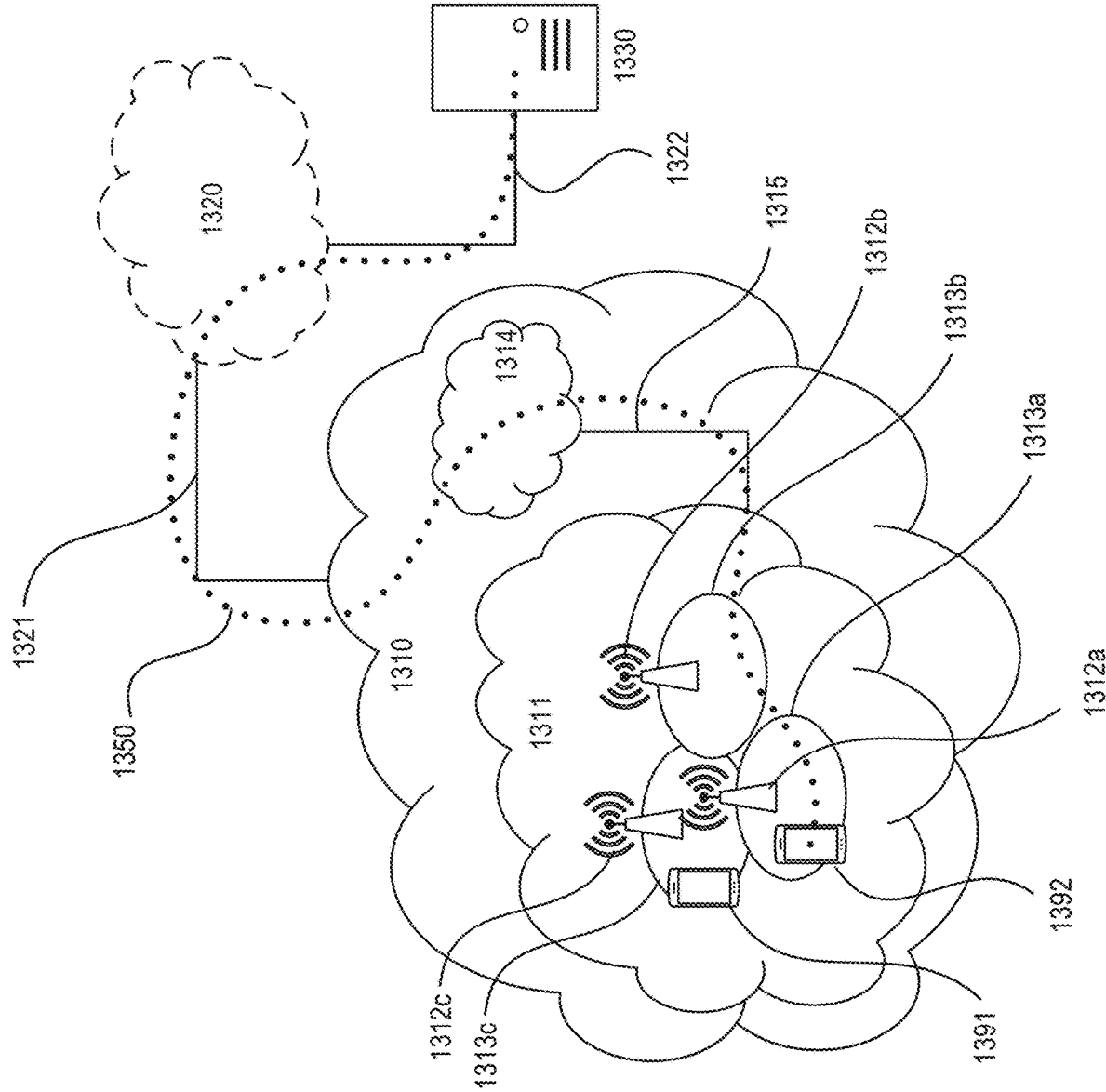
FIGS. 13-14 are block diagrams of various exemplary communication systems and/or networks, according to various exemplary embodiments of the present disclosure.

With reference to FIG. 13, in accordance with an embodiment, a communication system includes telecommunication network 1310, such as a 3GPP-type cellular network, which comprises access network 1311, such as a radio access network, and core network 1314. Access network 1311 comprises a plurality of base stations 1312a, 1312b, 1312c, such as NBs, eNBs, gNBs, or other types of wireless access points, each defining a corresponding coverage area 1313a, 1313b, 1313c. Each base station 1312a, 1312b, 1312c is connectable to core network 1314 over a wired or wireless connection 1315. A first UE 1391 located in coverage area 1313c can be configured to wirelessly connect to, or be paged by, the corresponding base station 1312c. A second UE 1392 in coverage area 1313a is wirelessly connectable to the corresponding base station 1312a. While a plurality of UEs 1391, 1392 are illustrated in this example, the disclosed embodiments are equally applicable to a situation where a sole UE is in the coverage area or where a sole UE is connecting to the Telecommunication network 1310 is itself connected to host computer 1330, which can be embodied in the hardware and/or software of a standalone server, a cloud-implemented server, a distributed server or as processing resources in a server farm. Host computer 1330 can be under the ownership or control of a service provider, or can be operated by the service provider or on behalf of the service provider. Connections 1321 and 1322 between telecommunication network 1310 and host computer 1330 can extend directly from core network 1314 to host computer 1330 or can go via an optional intermediate network 1320. Intermediate network 1320 can be one of, or a combination of more than one of, a public, private or hosted network; intermediate network 1320, if any, can be a backbone network or the Internet; in particular, intermediate network 1320 can comprise two or more sub-networks (not shown).

The communication system of FIG. 13 as a whole enables connectivity between the connected UEs 1391, 1392 and host computer 1330. The connectivity can be described as an over-the-top (OTT) connection 1350. Host computer 1330 and the connected UEs 1391, 1392 are configured to communicate data and/or signaling via OTT connection 1350, using access network 1311, core network 1314, any intermediate network 1320 and possible further infrastructure (not shown) as intermediaries. OTT connection 1350 can be transparent in the sense that the participating communication devices through which OTT connection 1350 passes are unaware of routing of uplink and downlink communications. For example, base station 1312 may not or need not be informed about the past routing of an incoming downlink communication with data originating from host computer 1330 to be forwarded (e.g., handed over) to a connected UE 1391. Similarly, base station 1312 need not be aware of the future routing of an outgoing uplink communication originating from the UE 1391 towards the host computer 1330.

Example implementations, in accordance with an embodiment, of the UE, base station and host computer discussed in the preceding paragraphs will now be described with reference to FIG. 14. In communication system 1400, host computer 1410 comprises hardware 1415 including communication interface 1416 configured to set up and maintain a wired or wireless connection with an interface of a different communication device of communication system 1400. Host computer 1410 further comprises processing circuitry 1418, which can have storage and/or processing capabilities. In particular, processing circuitry 1418 can comprise one or more programmable processors, application-specific integrated circuits, field programmable gate arrays or combinations of these (not shown) adapted to execute instructions. Host computer 1410 further comprises software 1411, which is stored in or accessible by host computer 1410 and executable by processing circuitry 1418. Software 1411 includes host application 1412. Host application 1412 can be operable to provide a service to a remote user, such as UE 1430 connecting via OTT connection 1450 terminating at UE 1430 and host computer 1410. In providing the service to the remote user, host application 1412 can provide user data which is transmitted using OTT connection 1450.

Communication system 1400 can also include base station 1420 provided in a telecommunication system and comprising hardware 1425 enabling it to communicate with host computer 1410 and with UE 1430. Hardware 1425 can include communication interface 1426 for setting up and maintaining a wired or wireless connection with an interface of a different communication device of communication system 1400, as well as radio interface 1427 for setting up and maintaining at least wireless connection 1470 with UE 1430 located in a coverage area (not shown in FIG. 14) served by base station 1420. Communication interface 1426 can be configured to facilitate connection 1460 to host computer 1410. Connection 1460 can be direct or it can pass through a core network (not shown in FIG. 14) of the telecommunication system and/or through one or more intermediate networks outside the telecommunication system. In the embodiment shown, hardware 1425 of base station 1420 can also include processing circuitry 1428, which can comprise one or more programmable processors, application-specific integrated circuits, field programmable gate arrays or combinations of these (not shown) adapted to execute instructions. Base station 1420 further has software 1421 stored internally or accessible via an external connection.

Communication system 1400 can also include UE 1430 already referred to. Its hardware 1435 can include radio interface 1437 configured to set up and maintain wireless connection 1470 with a base station serving a coverage area in which UE 1430 is currently located. Hardware 1435 of UE 1430 can also include processing circuitry 1438, which can comprise one or more programmable processors, application-specific integrated circuits, field programmable gate arrays or combinations of these (not shown) adapted to execute instructions. UE 1430 further comprises software 1431, which is stored in or accessible by UE 1430 and executable by processing circuitry 1438. Software 1431 includes client application 1432. Client application 1432 can be operable to provide a service to a human or non-human user via UE 1430, with the support of host computer 1410. In host computer 1410, an executing host application 1412 can communicate with the executing client application 1432 via OTT connection 1450 terminating at UE 1430 and host computer 1410. In providing the service to the user, client application 1432 can receive request data from host application 1412 and provide user data in response to the request data. OTT connection 1450 can transfer both the request data and the user data. Client application 1432 can interact with the user to generate the user data that it provides.

Figure 14:
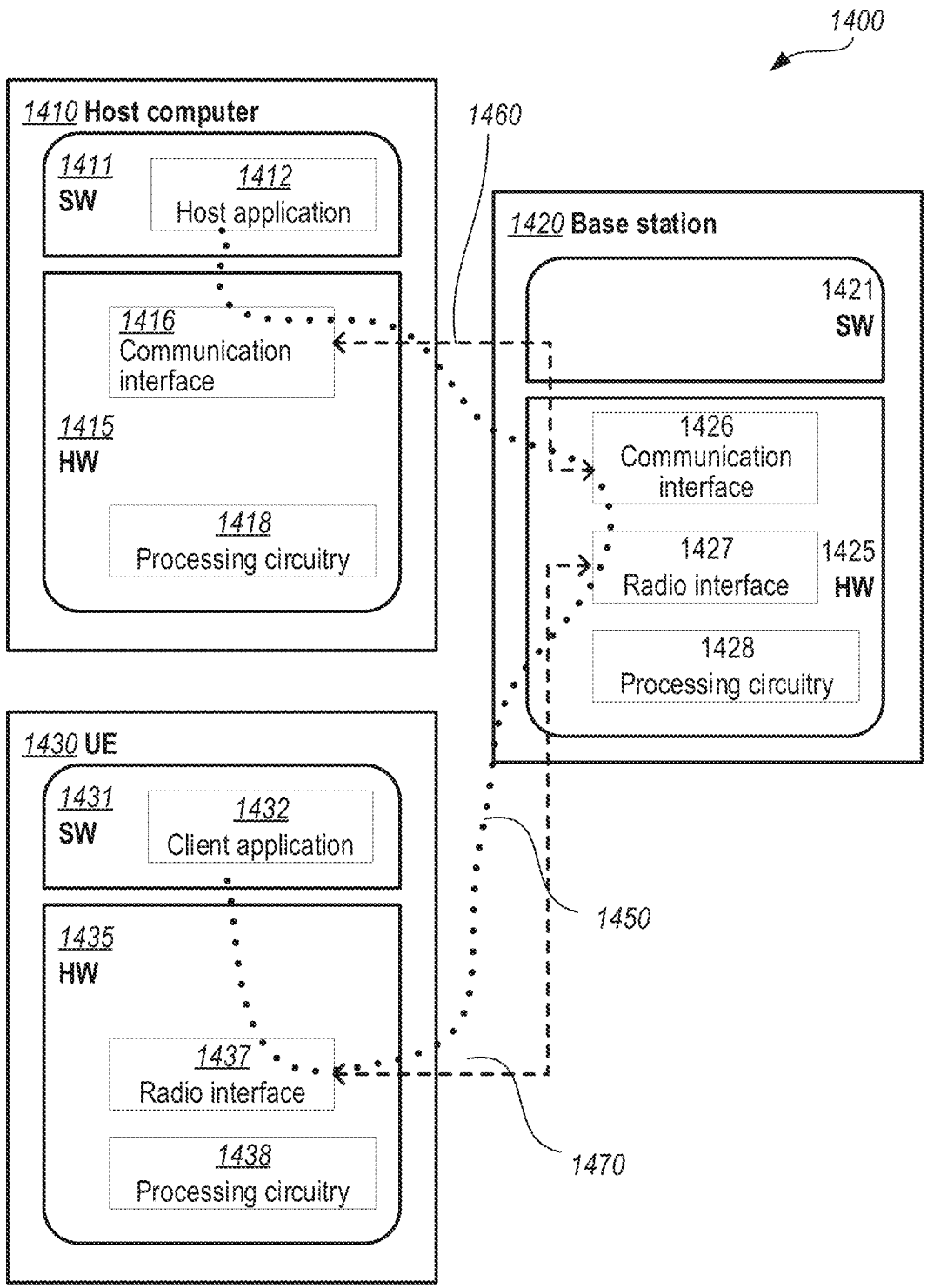

It is noted that host computer 1410, base station 1420 and UE 1430 illustrated in FIG. 14 can be similar or identical to host computer 1330, one of base stations 1312a, 1312b, 1312c and one of UEs 1391, 1392 of FIG. 13, respectively. This is to say, the inner workings of these entities can be as shown in FIG. 14 and independently, the surrounding network topology can be that of FIG. 13.

In FIG. 14, OTT connection 1450 has been drawn abstractly to illustrate the communication between host computer 1410 and UE 1430 via base station 1420, without explicit reference to any intermediary devices and the precise routing of messages via these devices. Network infrastructure can determine the routing, which it can be configured to hide from UE 1430 or from the service provider operating host computer 1410, or both. While OTT connection 1450 is active, the network infrastructure can further take decisions by which it dynamically changes the routing (e.g., on the basis of load balancing consideration or reconfiguration of the network).

Wireless connection 1470 between UE 1430 and base station 1420 is in accordance with the teachings of the embodiments described throughout this disclosure. One or more of the various embodiments improve the performance of OTT services provided to UE 1430 using OTT connection 1450, in which wireless connection 1470 forms the last segment. More precisely, the exemplary embodiments disclosed herein can improve flexibility for the network to monitor end-to-end quality-of-service (QoS) of data flows, including their corresponding radio bearers, associated with data sessions between a user equipment (UE) and another entity, such as an OTT data application or service external to the 5G network. These and other advantages can facilitate more timely design, implementation, and deployment of 5G/NR solutions. Furthermore, such embodiments can facilitate flexible and timely control of data session QoS, which can lead to improvements in capacity, throughput, latency, etc. that are envisioned by 5G/NR and important for the growth of OTT services.

A measurement procedure can be provided for the purpose of monitoring data rate, latency and other network operational aspects on which the one or more embodiments improve. There can further be an optional network functionality for reconfiguring OTT connection 1450 between host computer 1410 and UE 1430, in response to variations in the measurement results. The measurement procedure and/or the network functionality for reconfiguring OTT connection 1450 can be implemented in software 1411 and hardware 1415 of host computer 1410 or in software 1431 and hardware 1435 of UE 1430, or both. In embodiments, sensors (not shown) can be deployed in or in association with communication devices through which OTT connection 1450 passes; the sensors can participate in the measurement procedure by supplying values of the monitored quantities exemplified above, or supplying values of other physical quantities from which software 1411, 1431 can compute or estimate the monitored quantities. The reconfiguring of OTT connection 1450 can include message format, retransmission settings, preferred routing etc.; the reconfiguring need not affect base station 1420, and it can be unknown or imperceptible to base station 1420. Such procedures and functionalities can be known and practiced in the art. In certain embodiments, measurements can involve proprietary UE signaling facilitating host computer 1410's measurements of throughput, propagation times, latency and the like. The measurements can be implemented in that software 1411 and 1431 causes messages to be transmitted, in particular empty or 'dummy' messages, using OTT connection 1450 while it monitors propagation times, errors etc.

FIG. 15 is a flowchart illustrating an exemplary method and/or procedure implemented in a communication system, in accordance with one embodiment. The communication system includes a host computer, a base station and a UE which, in some exemplary embodiments, can be those described with reference to FIGS. 13 and 14. For simplicity of the present disclosure, only drawing references to FIG. 15 will be included in this section. In step 1510, the host computer provides user data. In substep 1511 (which can be optional) of step 1510, the host computer provides the user data by executing a host application. In step 1520, the host computer initiates a transmission carrying the user data to the UE. In step 1530 (which can be optional), the base station transmits to the UE the user data which was carried in the transmission that the host computer initiated, in accordance with the teachings of the embodiments described throughout this disclosure. In step 1540 (which can also be optional), the UE executes a client application associated with the host application executed by the host computer.

FIG. 16 is a flowchart illustrating an exemplary method and/or procedure implemented in a communication system, in accordance with one embodiment. The communication system includes a host computer, a base station and a UE which can be those described with reference to FIGS. 13 and 14. For simplicity of the present disclosure, only drawing references to FIG. 16 will be included in this section. In step 1610 of the method, the host computer provides user data. In an optional substep (not shown) the host computer provides the user data by executing a host application. In step 1620, the host computer initiates a transmission carrying the user data to the UE. The transmission can pass via the base station, in accordance with the teachings of the embodiments described throughout this disclosure. In step 1630 (which can be optional), the UE receives the user data carried in the transmission.

FIG. 17 is a flowchart illustrating an exemplary method and/or procedure implemented in a communication system, in accordance with one embodiment. The communication system includes a host computer, a base station and a UE which can be those described with reference to FIGS. 13 and 14. For simplicity of the present disclosure, only drawing references to FIG. 17 will be included in this section. In step 1710 (which can be optional), the UE receives input data provided by the host computer. Additionally or alternatively, in step 1720, the UE provides user data. In substep 1721 (which can be optional) of step 1720, the UE provides the user data by executing a client application. In substep 1711 (which can be optional) of step 1710, the UE executes a client application which provides the user data in reaction to the received input data provided by the host computer. In providing the user data, the executed client application can further consider user input received from the user. Regardless of the specific manner in which the user data was provided, the UE initiates, in substep 1730 (which can be optional), transmission of the user data to the host computer. In step 1740 of the method, the host computer receives the user data transmitted from the UE, in accordance with the teachings of the embodiments described throughout this disclosure.

FIG. 18 is a flowchart illustrating an exemplary method and/or procedure implemented in a communication system, in accordance with one embodiment. The communication system includes a host computer, a base station and a UE which can be those described with reference to FIGS. 13 and 14. For simplicity of the present disclosure, only drawing references to FIG. 18 will be included in this section. In step 1810 (which can be optional), in accordance with the teachings of the embodiments described throughout this disclosure, the base station receives user data from the UE. In step 1820 (which can be optional), the base station initiates transmission of the received user data to the host computer. In step 1830 (which can be optional), the host computer receives the user data carried in the transmission initiated by the base station.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various exemplary embodiments can be used together with one another, as well as interchangeably therewith, as should be understood by those having ordinary skill in the art.

The term unit, as used herein, can have conventional meaning in the field of electronics, electrical devices and/or electronic devices and can include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification, drawings and exemplary embodiments thereof, can be used synonymously in certain instances, including, but not limited to, e.g., data and information. It should be understood that, while these words and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

Example embodiments of the techniques and apparatus described herein include, but are not limited to, the following enumerated examples:

1. A method for a network node, configured to provide a cell in a radio access network (RAN), to schedule downlink (DL) channel-quality reports from user equipment (UEs) performing a random-access (RA) procedure in the cell, the method comprising:
  transmitting a first indicator that indicates whether the network node may request UEs performing a RA procedure in the cell to report DL channel quality during a particular message of the RA procedure;
  determining that a particular UE has initiated the RA procedure in the cell;
  transmitting, to the UE, a RA response, wherein:
    the RA response includes a second indicator if the network node determines that the UE is configured to operation in a first coverage mode, the second indicator indicating whether the UE is requested to report DL channel quality during the particular message; and
    the RA response does not include the second indicator if the network node determines that the UE is configured to operate in a second coverage mode;
  receiving the particular message from the UE, wherein whether the particular message includes a DL channel quality report is dependent on the first indicator, the configured coverage mode, and the content of the RA response.

2. The method of embodiment 1, wherein the first indicator is transmitted in system information broadcast by the network node.

3. The method of embodiment 1, wherein the first indicator is transmitted in the RA response.

4. The method of any of embodiments 1-3, wherein the RAN is a Long-Term Evolution (LTE) network and the particular message is a Msg3 of an LTE RA procedure.

5. The method of any of embodiments 1-4, wherein:
  the RAR response further includes a third indicator of whether or not the UE should perform early data transmission (EDT) during the particular message; and
  if the network node determines that the UE is in the second coverage mode and the EDT indicator indicates that the UE should perform EDT, the network node receives the DL channel quality in the particular message.

6. The method of embodiment 5, wherein the network node receives the DL channel quality report in the particular message if the third indicator indicates that the UE should perform EDT during the particular message.

7. The method of embodiment 9-13, further comprising transmitting a fourth indicator that indicates whether the network node may request UEs performing a RA procedure in the cell to perform early data transmission (EDT) during the particular message.

8. The method of embodiment 7, wherein if the fourth indicator indicates that the network node may request UEs performing a RA procedure in the cell to perform EDT, the network node receives the DL channel quality report in the particular message unless the second indicator is included in the RA response and indicates that the UE should not include the DL channel quality report in the particular message.

9. A method for a user equipment (UE), configured to operate in a coverage mode, to provide downlink (DL) channel-quality reports during a random-access (RA) procedure in a cell provided by a network node in a radio access network (RAN), the method comprising:
  receiving, from the network node, a first indicator that indicates whether the network node may request UEs performing a RA procedure in the cell to report DL channel quality during a particular message of the RA procedure;

initiating the RA procedure;
receiving a RA response from the network node, wherein:
the RA response includes a second indicator if the UE is configured to operate in a first coverage mode, the second indicator indicating whether the UE is requested to report DL channel quality during the particular message; and
the RA response does not include the second indicator if the UE is configured to operate in a second coverage mode;
determining whether to include a DL channel quality report in the particular message based on the first indicator, the configured coverage mode, and the content of the RA response; and
transmitting the particular message to the network node.

10. The method of embodiment 9, wherein the first indicator is received in system information broadcast by the network node.

11. The method of embodiment 9, wherein the first indicator is received in the RA response.

12. The method of any of embodiments 9-11, wherein the RAN is a Long-Term Evolution (LTE) network and the particular message is a Msg3 of an LTE RA procedure.

13. The method of any of embodiments 9-12, further comprising initiating DL channel quality measurements after initiating the RA procedure but before receiving the RA response.

14. The method of any of embodiments 9-13, wherein:
the RAR response further includes a third indicator of whether or not the UE should perform early data transmission (EDT) during the particular message; and
if the UE is in the second coverage mode and the EDT indicator indicates that the UE should perform EDT, the UE determines to include a DL channel quality report in the particular message.

15. The method of embodiment 14, wherein the UE determines to include the DL channel quality report in the particular message if the third indicator indicates that the UE should perform EDT during the particular message.

16. The method of embodiment 9-13, further comprising receiving, from the network node, a fourth indicator that indicates whether the network node may request UEs performing a RA procedure in the cell to perform early data transmission (EDT) during the particular message.

17. The method of embodiment 16, wherein the fourth indicator is received in system information broadcast by the network node.

18. The method of any of embodiments 16-17, wherein if the fourth indicator indicates that the network node may request UEs performing a RA procedure in the cell to perform EDT, the UE determines to include the DL channel quality report in the particular message unless the second indicator is included in the RA response and indicates that the UE should not include the DL channel quality report in the particular message.

19. A network node configured to provide a cell in a radio access network (RAN) and to schedule downlink (DL) channel-quality reports from user equipment (UEs) performing a random-access (RA) procedure in the cell, the network node comprising:
a communication interface; and
processing circuitry operably coupled to the communication interface and configured to perform any operations of any of embodiments 1-8; and
power supply circuitry configured to supply power to the network node.

20. A user equipment (UE) configured to operate in a coverage mode and to provide downlink (DL) channel-quality reports during a random-access (RA) procedure in a cell provided by a network node in a radio access network (RAN), the UE comprising:
a communication interface; and
processing circuitry operably coupled to the communication interface and configured to perform any operations of any of embodiments 9-18; and
power supply circuitry configured to supply power to the UE.

21. A communication system including a host computer comprising:
processing circuitry configured to provide user data; and
a communication interface configured to forward the user data to a cellular network for transmission to a user equipment (UE), wherein the cellular network comprises a base station having a radio interface and processing circuitry, the base station's processing circuitry configured to perform any of the operations comprising embodiments 1-8.

22. The communication system of the previous embodiment further including the base station.

23. The communication system of the previous two embodiments, further including the UE, wherein the UE includes a radio interface and processing circuitry configured to communicate with the base station and cooperatively perform any of the operations comprising embodiments 9-18.

24. The communication system of the previous three embodiments, wherein:
the processing circuitry of the host computer is configured to execute a host application, thereby providing the user data; and
the UE's processing circuitry is further configured to execute a client application associated with the host application.

25. A method implemented in a communication system including a host computer, a base station, and a User Equipment (UE), the method comprising:
at the host computer, providing user data;
at the host computer, initiating a transmission carrying the user data to the UE via a cellular network comprising the base station; and
at the base station, performing operations corresponding to any of embodiments 1-8.

26. The method of the previous embodiment, further comprising, at the base station, transmitting the user data.

27. The method of the previous two embodiments, wherein the user data is provided at the host computer by executing a host application, the method further comprising, at the UE, executing a client application associated with the host application.

28. The method of the previous three embodiments, further comprising, at the UE, performing operations corresponding to any of embodiments 9-18.

29. A communication system including a host computer comprising a communication interface configured to receive user data originating from a transmission from a User equipment (UE) to a base station, the base station comprising a radio interface and processing circuitry configured to communicate with the base station and cooperatively perform operations of any of embodiments 1-8.

30. The communication system of the previous embodiment further including the base station.

31. The communication system of the previous two embodiments, further including the UE, wherein the UE includes a radio interface and processing circuitry configured to communicate with the base station and perform any of the operations comprising embodiments 9-18.

33. The communication system of the previous three embodiments, wherein:
the processing circuitry of the host computer is configured to execute a host application; and
the UE is further configured to execute a client application associated with the host application, thereby providing the user data to be received by the host computer.

34. A non-transitory, computer-readable medium storing computer-executable instructions that, when executed by a processing unit comprising a network node that provides a cell in a radio access network (RAN), configure the network node to perform operations corresponding to any of the methods of embodiments 1-8.

35. A non-transitory, computer-readable medium storing computer-executable instructions that, when executed by a processing unit comprising a user equipment (UE) configured to perform a random access (RA) procedure with a cell in a radio access network (RAN), configure the UE to perform operations corresponding to any of the methods of embodiments 9-18.

The invention claimed is:

1. A method for a user equipment (UE) configured for reduced bandwidth, low complexity, and coverage enhancement (BL/CE), the method comprising:
receiving, in system information broadcast by a network node in a radio access network (RAN), an indicator indicating that the UE is configured to provide downlink (DL) channel quality reports in a Msg3 message of a random-access (RA) procedure in a cell provided by the network node;
initiating DL channel quality measurements in response to receiving the indicator;
transmitting a RA preamble that initiates the RA procedure in the cell;
receiving a RA response grant, from the network node, indicating resources to be used for the Msg3 message; and
transmitting the Msg3 message, wherein the Msg3 message includes a DL channel quality report, determined based on the DL channel quality measurements, when the indicated resources are large enough to carry the DL channel quality report.

2. The method of claim 1, wherein the broadcast system information received from the network node also includes at least one of the following: a channel quality information (CQI) table; reporting criteria to be used for the DL channel quality report; and an indication whether channel quality reporting is used when early data transmission (EDT) is enabled.

3. The method of claim 1, wherein the coverage enhancement (CE) includes a plurality of CE modes, and Msg3 message including the DL channel quality report is transmitted regardless of the particular CE mode in which the UE is configured to operate.

4. The method of claim 1, wherein the DL channel quality report is a channel state information (CSI) report.

5. The method of claim 1, wherein the DL channel quality report is determined for one or more particular narrowbands in a frequency domain.

6. The method of claim 1, wherein the RAN is a Long-Term Evolution (LTE) network.

7. A method for a network node configured to provide a cell in a radio access network (RAN), the method comprising:
transmitting, in system information broadcast in the cell, an indicator indicating that user equipment (UEs) configured for reduced bandwidth, low complexity, and coverage enhancement (BL/CE) are further configured to provide downlink (DL) channel quality reports in a Msg3 message of a random-access (RA) procedure in the cell;
receiving, from the UE, a RA preamble that initiates the UE's RA procedure in the cell;
transmitting, to the UE in response to the RA preamble, a RA response grant indicating resources to be used for the Msg3 message; and
receiving the Msg3 message from the UE, wherein the Msg3 message includes a DL channel quality report when the indicated resources are large enough to carry the DL channel quality report.

8. The method of claim 7, wherein the broadcast system information also includes at least one of the following: a channel quality information (CQI) table; reporting criteria to be used for the DL channel quality report; and an indication whether channel quality reporting is used when early data transmission (EDT) is enabled.

9. The method of claim 7, wherein the coverage enhancement (CE) includes a plurality of CE modes, and the Msg3 message including the DL channel quality report is received regardless of the particular CE mode in which the UE is configured to operate.

10. The method of claim 7, wherein the DL channel quality report is a channel state information (CSI) report.

11. The method of claim 7, wherein the DL channel quality report is determined for one or more particular narrowbands in a frequency domain.

12. The method of claim 7, wherein the RAN is a Long-Term Evolution (LTE) network.

13. A user equipment (UE) configured for reduced bandwidth, low complexity, and coverage enhancement (BL/CE), the UE comprising:
radio interface circuitry configured to communicate with a network node in a radio access network (RAN); and
processing circuitry operably coupled to the radio interface circuitry, whereby the processing circuitry and the radio interface circuitry are configured to:
receive, in system information broadcast by the network node, an indicator indicating that the UE is configured to provide downlink (DL) channel quality reports in a Msg3 message of a random-access (RA) procedure in a cell provided by the network node;
initiate DL channel quality measurements in response to receiving the indicator;
initiate the RA procedure in the cell by transmitting a RA preamble;
receive a RA response grant, from the network node, indicating resources to be used for the Msg3 message; and
transmit the Msg3 message, wherein the Msg3 message includes a DL channel quality report determined based on the DL channel quality measurements when the indicated resources are large enough to carry the DL channel quality report.

14. The UE of claim 13, wherein the broadcast system information received from the network node also includes at least one of the following: a channel quality information (CQI) table; reporting criteria to be used for the DL channel quality report; and an indication whether channel quality reporting is used when early data transmission (EDT) is enabled.

15. The UE of claim 13, wherein the coverage enhancement (CE) includes a plurality of CE modes, and Msg3 message including the DL channel quality report is transmitted regardless of the particular CE mode in which the UE is configured to operate.

16. A non-transitory, computer-readable medium storing computer-executable instructions that, when executed by processing circuitry of a user equipment (UE) configured for reduced bandwidth, low complexity, and coverage enhancement (BL/CE), configure the UE to perform operations corresponding to the method of claim 1.

17. A network node configured to provide a cell in a radio access network (RAN), the network node comprising:
 radio interface circuitry operable to communicate with bandwidth-reduced, low-complexity and Coverage Enhancement (BL/CE) user equipment (UEs); and
 processing circuitry operably coupled to the radio interface circuitry, whereby the processing circuitry and the radio interface circuitry are configured to perform operations corresponding to the method of claim 7.

18. The network node of claim 17, wherein the broadcast system information also includes at least one of the following: a channel quality information (CQI) table; reporting criteria to be used for the DL channel quality report; and an indication whether channel quality reporting is used when early data transmission (EDT) is enabled.

19. The network node of claim 17, wherein the coverage enhancement (CE) includes a plurality of CE modes, and the Msg3 message including the DL channel quality report is received regardless of the particular CE mode in which the UE is configured to operate.

20. A non-transitory, computer-readable medium storing computer-executable instructions that, when executed by processing circuitry of a network node configured to provide a cell in a radio access network (RAN), configure the network node to perform operations corresponding to the method of claim 7.

* * * * *